(12) United States Patent
Takao

(10) Patent No.: US 12,085,937 B2
(45) Date of Patent: Sep. 10, 2024

(54) ARITHMETIC DEVICE, MOVEMENT CONTROL SYSTEM, CONTROL DEVICE, MOVING OBJECT, CALCULATION METHOD, AND COMPUTER-READABLE STORAGE MEDIUM

(71) Applicant: Mitsubishi Logisnext Co., Ltd., Nagaokakyo (JP)

(72) Inventor: Kenji Takao, Tokyo (JP)

(73) Assignee: MITSUBISHI LOGISNEXT CO., LTD., Nagaokakyo (JP)

( * ) Notice: Subject to any disclaimer, the term of this patent is extended or adjusted under 35 U.S.C. 154(b) by 223 days.

(21) Appl. No.: 17/181,273

(22) Filed: Feb. 22, 2021

(65) Prior Publication Data

US 2021/0271246 A1 Sep. 2, 2021

(30) Foreign Application Priority Data

Feb. 27, 2020 (JP) .................................. 2020-032154

(51) Int. Cl.
*G05D 1/00* (2024.01)
*G06F 9/30* (2018.01)
(Continued)

(52) U.S. Cl.
CPC ......... *G05D 1/0212* (2013.01); *G05D 1/0027* (2013.01); *G05D 1/0094* (2013.01);
(Continued)

(58) Field of Classification Search
CPC .. G05D 1/0212; G05D 1/0027; G05D 1/0094; G05D 2201/0216; G06V 20/58; G06V 20/64; G06F 9/3001
See application file for complete search history.

(56) References Cited

U.S. PATENT DOCUMENTS

2004/0068348 A1\* 4/2004 Jager .................... G05D 1/0295
700/255
2016/0090284 A1\* 3/2016 Svensson .............. B66F 9/0755
701/50
(Continued)

FOREIGN PATENT DOCUMENTS

DE 102006054083 A1 5/2008
EP 3 000 772 A1 3/2016
(Continued)

OTHER PUBLICATIONS

Extended European Search Report dated Jan. 7, 2022 issued in corresponding European Patent Application No. 21 159 651.6.
(Continued)

*Primary Examiner* — Andrew J Cromer
(74) *Attorney, Agent, or Firm* — Birch, Stewart, Kolasch & Birch, LLP

(57) ABSTRACT

An arithmetic device is an arithmetic device configured to output information to a moving object that automatically moves. The arithmetic device includes: a target object information acquisition unit configured to acquire, from a sensor provided in a place other than to the moving object, a detection result of position information of a target object, the position information being information related to position and orientation of the target object; a route setting unit configured to set, based on the position information of the target object, a route to a target position at which predetermined position and orientation relative to the target object are reached; and an information output unit configured to output information of the route to the moving object.

9 Claims, 17 Drawing Sheets

(51) Int. Cl.
*G06V 20/58* (2022.01)
*G06V 20/64* (2022.01)

(52) U.S. Cl.
CPC ............ *G06F 9/3001* (2013.01); *G06V 20/58* (2022.01); *G06V 20/64* (2022.01)

(56) References Cited

U.S. PATENT DOCUMENTS

2017/0097232 A1\* 4/2017 Anderson-Sprecher ..................... B25J 9/1697
2017/0285643 A1 10/2017 Ichinose et al.
2018/0346029 A1\* 12/2018 Kabos .................... G05D 1/028
2019/0243374 A1 8/2019 Ikawa et al.

FOREIGN PATENT DOCUMENTS

| JP | 60-34607 U | 3/1985 |
| JP | 2003-104685 A | 4/2003 |
| JP | 2017-182502 A | 10/2017 |
| JP | 2019-131392 A | 8/2019 |
| WO | WO 2017/091066 A1 | 6/2017 |
| WO | 2019/163378 A1 | 8/2019 |

OTHER PUBLICATIONS

Japanese Office Action for Japanese Application No. 2020-032154, dated Jun. 29, 2021, with English translation.
Partial European Search Report for European Application No. 21159641.6, dated Aug. 3, 2021.
Extended European Search Report dated Jan. 7, 2022 issued in corresponding European Patent Application No. 21 159 641.6.

\* cited by examiner

FIG.8
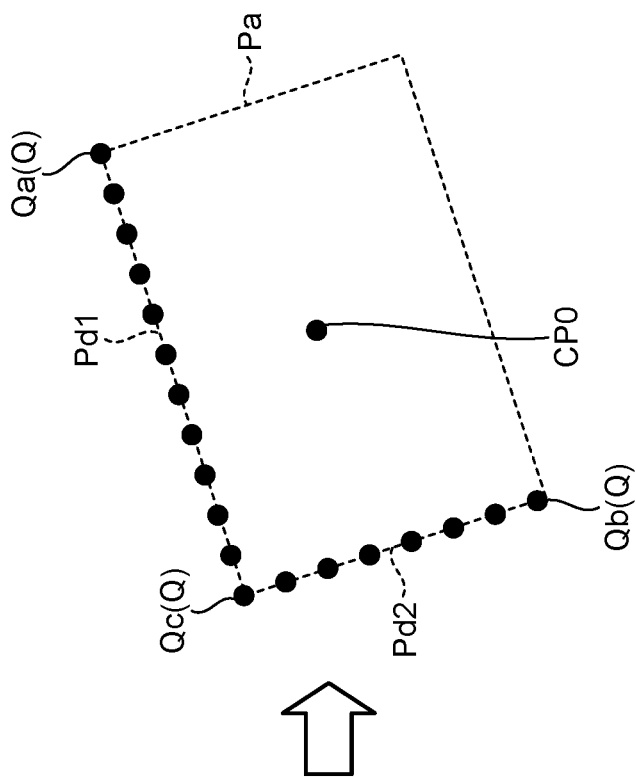
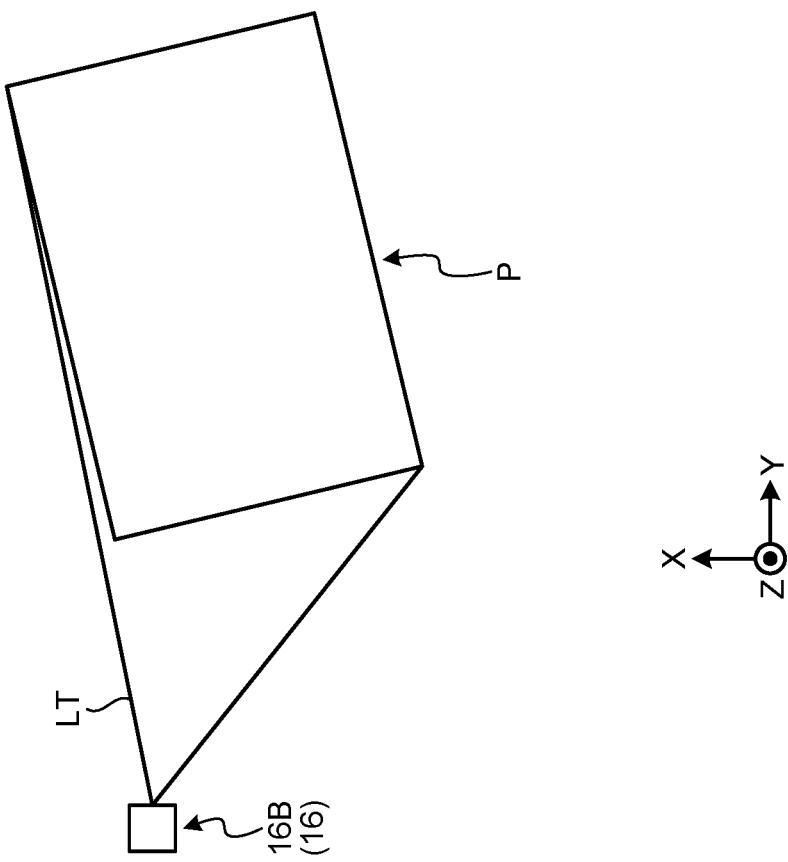

ARITHMETIC DEVICE, MOVEMENT CONTROL SYSTEM, CONTROL DEVICE, MOVING OBJECT, CALCULATION METHOD, AND COMPUTER-READABLE STORAGE MEDIUM

CROSS-REFERENCE TO RELATED APPLICATIONS

The present application claims priority to and incorporates by reference the entire contents of Japanese Patent Application No. 2020-032154 filed in Japan on Feb. 27, 2020.

FIELD

The present invention relates to an arithmetic device, a movement control system, a control device, a moving object, a calculation method, and a computer-readable storage medium.

BACKGROUND

Technologies of automatically moving a moving object such as a forklift to a target position have been known. Patent Literature 1 discloses that wide area trajectory data to a second set position at which a sensor of a forklift is effective is generated based on map data, and an approach trajectory from the second set position to pickup of a pallet is generated based on a result of detection by the sensor of the forklift.

CITATION LIST

Patent Literature

Patent Literature 1: Japanese Patent Laid-open No. 2017-182502

SUMMARY

Technical Problem

In Patent Literature 1, the wide area trajectory data to the second set position is generated based on the map data, but it is difficult to generate the wide area trajectory data in advance when a target object is not disposed at a predetermined position in, for example, a free space. For example, when a pallet mounted on a vehicle is to be directly picked up, it is difficult to generate the wide area trajectory data in advance because the position of the target object is not fixed due to difference in the position at which the vehicle stops, difference in the size of the vehicle, and the like. In such a case, the target object can be sensed by the sensor of the forklift and a trajectory can be generated, but in a case in which an approximate position of the target object is not determined, a trajectory calculation load is high, calculation takes time, and work is potentially delayed. In addition, an arithmetic device needs high performance in some cases. Furthermore, an object cannot be appropriately sensed, depending on the resolution and azimuth angle of the sensor. Thus, it has been required to generate a path through which a target object can be appropriately picked up for a moving object that automatically moves.

The present disclosure is intended to solve the above-described problem, and an object of the present disclosure is to provide an arithmetic device, a movement control system, a control device, a moving object, a calculation method, and a computer-readable storage medium that are capable of generating a path through which a target object can be appropriately picked up for a moving object that automatically moves.

Solution to Problem

To solve the above problem and achieve the object, an arithmetic device according to the present disclosure is configured to output information to a moving object that automatically moves. The arithmetic device includes: a target object information acquisition unit configured to acquire, from a sensor provided in a place other than to the moving object, a detection result of position information of a target object, the position information being information related to position and orientation of the target object; a route setting unit configured to set, based on the position information of the target object, a path to a target position at which predetermined position and orientation relative to the target object are reached; and an information output unit configured to output information on the path to the moving object.

To solve the above problem and achieve the object, a movement control system according to the present disclosure includes: the arithmetic device; and the moving object.

To solve the above problem and achieve the object, a control device according to the present disclosure is for a moving object that automatically moves. The control device includes: a route information acquisition unit configured to acquire a path to a target position at which predetermined position and orientation relative to the target object are reached, the path being generated based on position information of a target object, the position information being information related to position and orientation of the target object that are detected by a sensor provided in a place other than to the moving object; and a movement control unit configured to move the moving object based on the path.

To solve the above problem and achieve the object, a moving object according to the present disclosure includes the control device.

To solve the above problem and achieve the object, a calculation method according to the present disclosure is for outputting information to a moving object that automatically moves. The calculation method includes: acquiring, from a sensor provided in a place other than to the moving object, a detection result of position information of a target object, the position information being information related to position and orientation of the target object; generating, based on the position information of the target object, a path to a target position at which predetermined position and orientation relative to the target object are reached; and outputting information of the path to the moving object.

To solve the above problem and achieve the object, a non-transitory computer-readable storage medium according to the present disclosure stores a program for causing a computer to execute a calculation method of outputting information to a moving object that automatically moves. The program includes: acquiring, from a sensor provided in a place other than to the moving object, a detection result of position information of a target object, the position information being information related to position and orientation of the target object; generating, based on the position information of the target object, a path to a target position at which predetermined position and orientation relative to the target object are reached; and outputting information of the path to the moving object.

Advantageous Effects of Invention

According to the present disclosure, it is possible to generate a path through which a target object can be appropriately picked up for a moving object that automatically moves.

BRIEF DESCRIPTION OF DRAWINGS

FIG. 8 is a diagram illustrating other exemplary detection of position information of the pallet by the sensor.

DESCRIPTION OF EMBODIMENTS

Preferable embodiments of the present invention will be described below in detail with the accompanying drawings. The present invention is not limited to the present embodiments but includes a configuration in which the embodiments are combined.

First Embodiment

Figure 1:
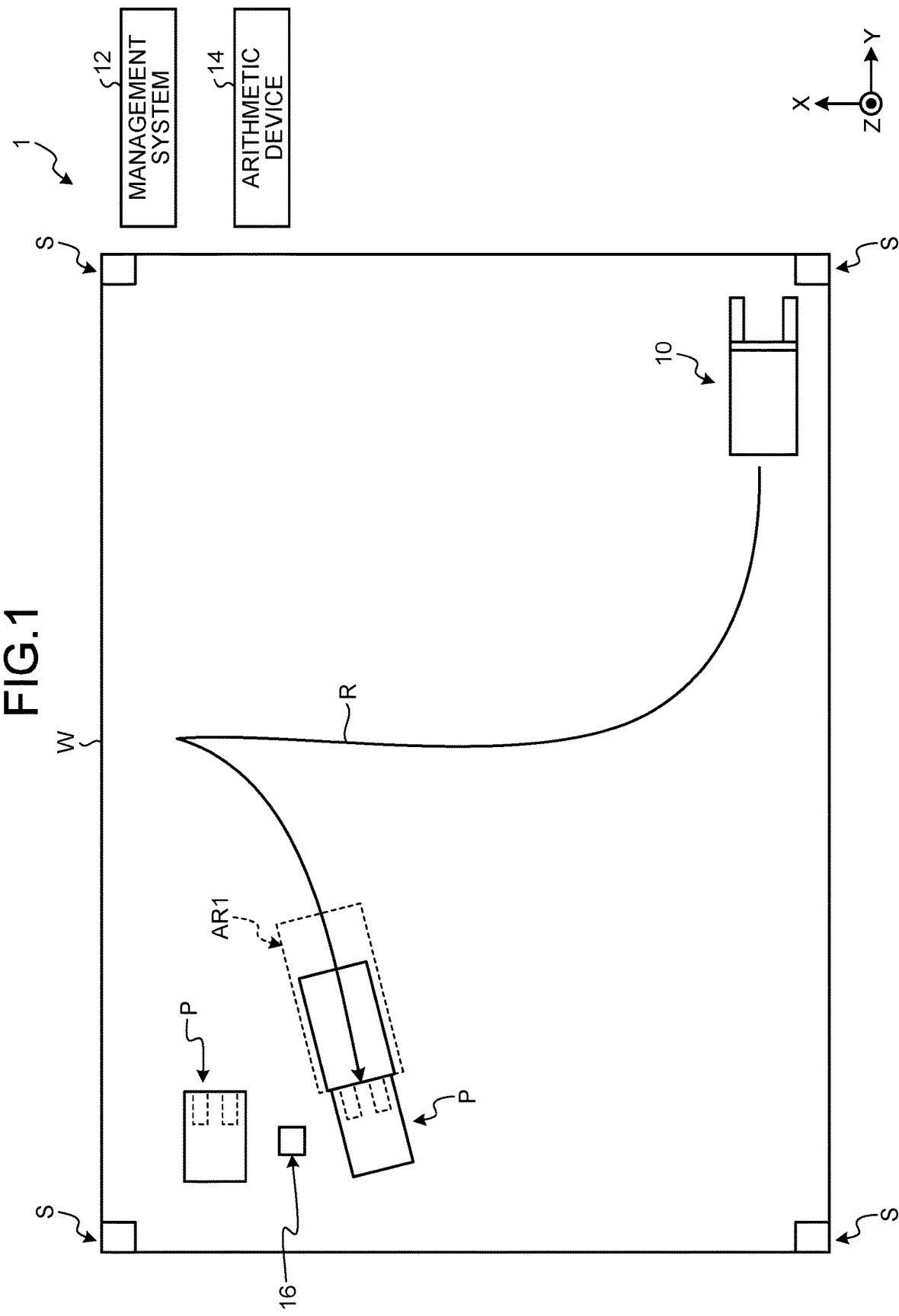
FIG. 1 is a schematic diagram of a movement control system according to a first embodiment.

Entire Configuration of Movement Control System
FIG. 1 is a schematic diagram of a movement control system according to a first embodiment. As illustrated in FIG. 1, this movement control system 1 according to the first embodiment includes a moving object 10, a management system 12, an arithmetic device 14, and a sensor 16. The movement control system 1 is a system configured to control movement of the moving object 10 belonging to a facility W. The facility W is a facility such as a warehouse in which logistics is managed. A pallet P as a target object is installed in a region A in the facility W. In the present embodiment, a package P1 is mounted on the pallet P (refer to FIG. 6), and thus the pallet P and the package P1 can be collectively regarded as a conveyed target object. The region A is, for example, a floor surface of the facility W and is a region in which the pallet P (package) is installed and the moving object 10 is moved. In the present embodiment, it is permitted to install the pallet P at any position in the facility W, and the pallet P is installed at any position in the facility W. However, it may be defined that the pallet P is disposed in an installation region set in the facility W in advance, and in this case, the pallet P is installed in the installation region. The installation region is set in advance as a region in which the pallet P (package) as a target object is to be installed. The installation region is partitioned by, for example, white lines, and the position (coordinates), shape, and size of the installation region are set in advance. The installation region is provided in the region A, which is the floor of the facility W, but not limited thereto. For example, the installation region may be provided in a cargo bed of a vehicle on which the pallet P is conveyed into the facility W. Alternatively, the installation region may be a region where the vehicle on which the pallet P is conveyed into the facility W stops. For example, a plurality of pallets P may be installed in the installation region, in other words, the installation region may be a free space in which a plurality of pallets P are installable. In the free space, it is permitted to freely install the pallet P in the installation region in some cases, and the position and orientation of the pallet P in the installation region are not determined in advance in some cases. However, for example, the installation region may be partitioned for each pallet P so that one pallet P is disposed in the installation region. In this case as well, the position and posture of the pallet P installed in the installation region are potentially shifted from those expected. The installation region is, for example, rectangular, but may be any shape and size.

The moving object 10 is a device capable of automatically moving. In the present embodiment, the moving object 10 is a forklift, more specifically, what is called an automated guided forklift (AGF) or an automated guided vehicle (AGV). As exemplarily illustrated in FIG. 1, the moving object 10 moves on the region A in the facility W. The moving object 10 moves to a target position-posture (target position) AR1 in accordance with a route (path) R set by the arithmetic device 14 and picks up the pallet P. The target position-posture AR1 is a position and a posture at which predetermined position and orientation relative to the pallet P are reached, and is a position-posture at which the moving object 10 can pick up the pallet P. In an example of the present embodiment, the target position-posture AR1 is the position and posture (orientation) of the moving object 10 at which the moving object 10 can insert a fork 24 of the moving object 10 to be described later into an opening Pb of the pallet P to be described later by traveling straight without moving in the lateral direction. The moving object 10 travels straight from the target position-posture AR1, picks up the pallet P, and conveys the pallet P to another place. Details of the route R will be described later. Hereinafter, an X direction is defined to be one direction along the region A, and a Y direction is defined to be a direction along the region A and orthogonal to the X direction. In addition, a Z direction is defined to be a direction orthogonal to the region A, in other words, a direction orthogonal to the X and Y directions. The X and Y directions is aligned with the horizontal direction, and the Z direction is aligned with the vertical direction.

Moving Object

Figure 2:
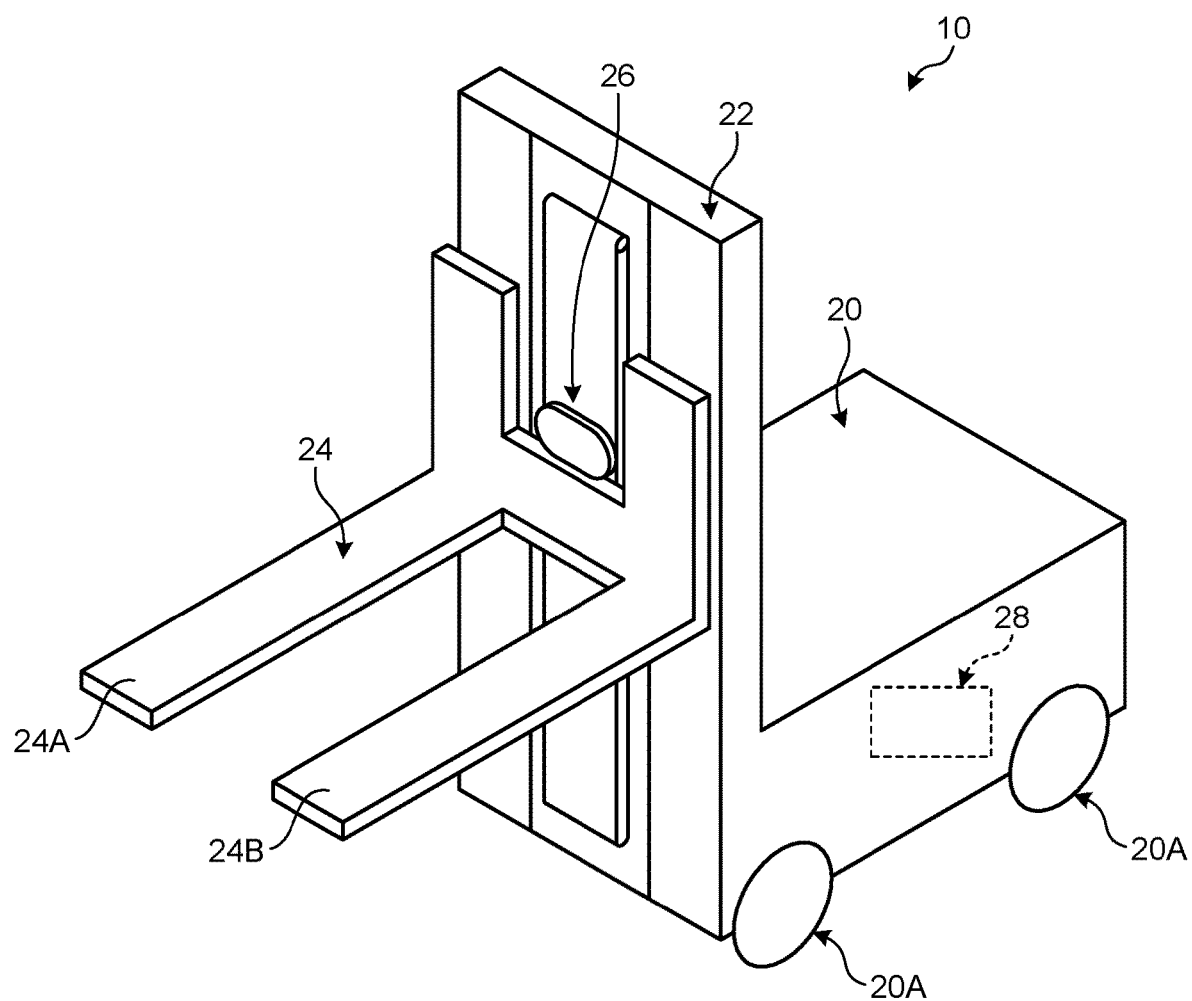
FIG. 2 is a schematic diagram of the configuration of a moving object.

FIG. 2 is a schematic diagram of the configuration of the moving object. As illustrated in FIG. 2, the moving object 10 includes a vehicle body 20, a mast 22, the fork 24, a sensor 26, and a control device 28. The vehicle body 20 includes wheels 20A. The mast 22 is provided at one end part of the vehicle body 20 in front and back directions. The mast 22 extends in upward and downward directions (in this example, the Z direction) orthogonal to the front and back directions. The fork 24 is attached to the mast 22 so that the fork 24 is movable in the Z direction. The fork 24 may be movable relative to the mast 22 in the lateral direction (direction orthogonal to the upward and downward directions and the front and back directions) of the vehicle body 20. The fork 24 includes a pair of claws 24A and 24B. The claws 24A and 24B extend from the mast 22 toward the front direction of the vehicle body 20. The claws 24A and 24B are disposed on the mast 22 and separated from each other in the lateral direction. Hereinafter, among the front and back directions, a direction on a side on the fork 24 is provided in the moving object 10 is defined as a first direction, and a direction on a side on which the fork 24 is not provided is defined as a second direction.

The sensor 26 detects at least one of the position and orientation of an object around the vehicle body 20. The sensor 26 detects the position of the object relative to the moving object 10 and the orientation of the object relative to the moving object 10. In the present embodiment, the sensor 26 is provided to the mast 22 and detects the position and orientation of an object on the first direction side of the vehicle body 20. However, the direction of detection by the sensor 26 is not limited to the first direction, but the detection may be performed, for example, on both the first direction side and the second direction side. In this case, a sensor configured to perform detection on the first direction side and a sensor configured to perform detection on the second direction side may be provided as the sensor 26. The sensor 26 is, for example, a sensor configured to emit a laser beam. The sensor 26 emits a laser beam while scanning in one direction (in this example, the lateral direction) and detects the position and orientation of an object based on reflected light of the emitted laser beam. The sensor 26 is not limited to those described above but may be a sensor configured to detect an object by any method and may be, for example, a camera. A position at which the sensor 26 is provided is not limited to the mast 22. Specifically, for example, a safety sensor provided to the moving object 10 may be used as the sensor 26. When the safety sensor is used as the sensor 26, no sensor needs to be newly provided. The sensor 26 is not an essential component and no sensor 26 may be provided to the moving object 10.

The control device 28 controls movement of the moving object 10. The control device 28 will be described later.

Management System

Figure 3:
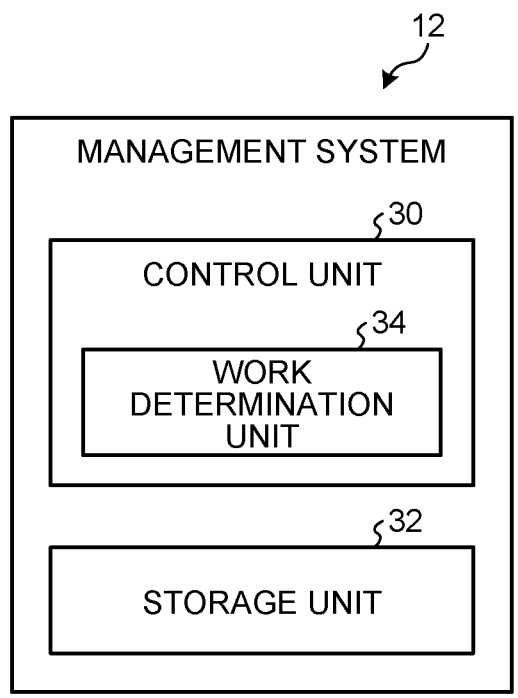
FIG. 3 is a schematic block diagram of a management system.

FIG. 3 is a schematic block diagram of the management system. The management system 12 is a system configured to manage logistics in the facility W. The management system 12 is a warehouse management system (WMS) in the present embodiment but is not limited to a WMS and may be any system, for example, a back-end system such as another production management system. The management system 12 is provided at any position and may be provided in the facility W or may be provided at a position separated from the facility W to manage the facility W from the separated position. The management system 12 is a computer including a control unit 30 and a storage unit 32 as illustrated in FIG. 3. The storage unit 32 is a memory configured to store various kinds of information such as the contents of calculation by the control unit 30 and computer programs and includes, for example, at least one of a random access memory (RAM), a main storage device such as a read only memory (ROM), and an external storage device such as a hard disk drive (HDD).

The control unit 30 is an arithmetic device, in other words, a central processing unit (CPU). The control unit 30 includes a work determination unit 34. The control unit 30 achieves the work determination unit 34 and executes processing thereof by reading a computer program (software) from the storage unit 32 and executing the computer program. The control unit 30 may execute processing with one CPU or may include a plurality of CPUs and execute processing with the CPUs. The work determination unit 34 may be achieved by a hardware circuit.

The work determination unit 34 determines a conveyance target pallet P. Specifically, the work determination unit 34 determines, based on an input work plan or the like, a work content indicating information of the conveyance target pallet P. The work content is information that specifies the conveyance target pallet P. In an example of the present embodiment, the work content determines which pallet P (package) in which facility is to be conveyed to where by when. Specifically, the work determination unit 34 is information indicating a facility in which the target pallet P is stored, the target pallet P, a conveyance destination of the pallet P, and a conveyance timing of the pallet P. The work determination unit 34 transmits the determined work content to the arithmetic device 14.

Arithmetic Device

Figure 4:
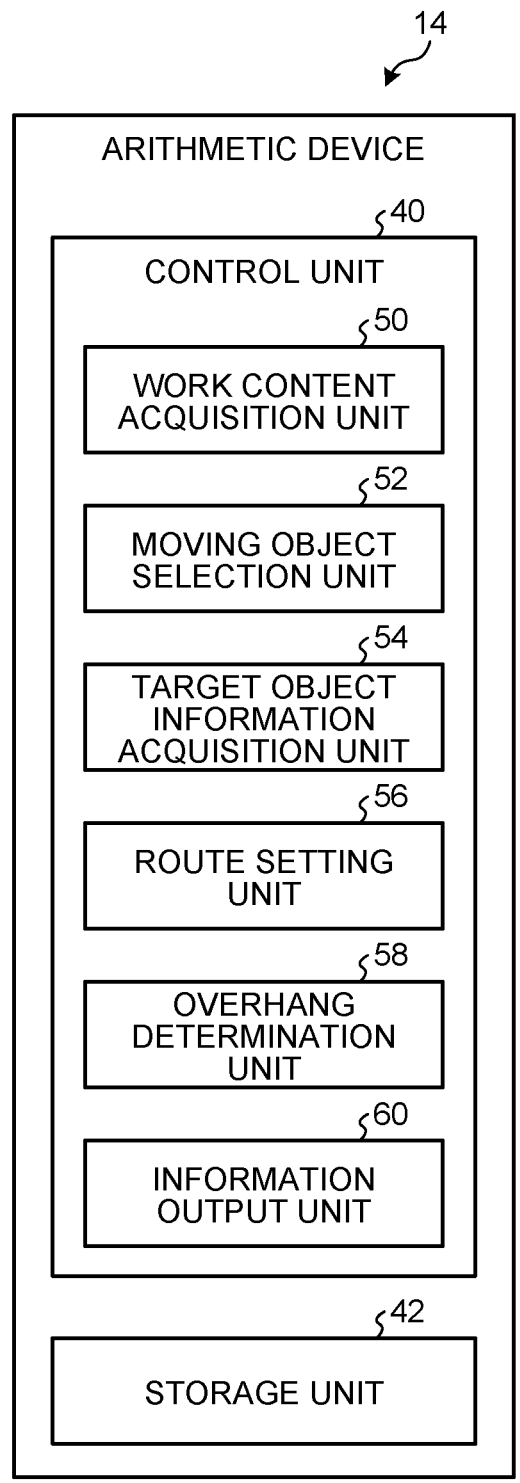
FIG. 4 is a schematic block diagram of an arithmetic device.

FIG. 4 is a schematic block diagram of the arithmetic device. The arithmetic device 14 is a device provided in the facility W and configured to calculate and output at least information related to movement of the moving object 10. The arithmetic device 14 is a computer including a control unit 40 and a storage unit 42 as illustrated in FIG. 4. The storage unit 42 is a memory configured to store various kinds of information such as the contents of calculation by the control unit 40 and computer programs and includes, for example, at least one of a RAM, a main storage device a ROM such as, and an external storage device such as an HDD.

The control unit 40 is an arithmetic device, in other words, a CPU. The control unit 40 includes a work content acquisition unit 50, a moving object selection unit 52, a target object information acquisition unit 54, a route setting unit 56, an overhang determination unit 58, and an information output unit 60. The control unit 40 achieves the work content acquisition unit 50, the moving object selection unit 52, the target object information acquisition unit 54, the route setting unit 56, the overhang determination unit 58, and the information output unit 60 and executes processing thereof by reading and executing a computer program (software) from the storage unit 42. The control unit 40 may execute processing with one CPU or may include a plurality of CPUs and execute processing with the CPUs. At least part of the work content acquisition unit 50, the moving object selection unit 52, the target object information acquisition unit 54, the route setting unit 56, the overhang determination unit 58, and the information output unit 60 may be achieved by a hardware circuit. At least one of the target object information acquisition unit 54, the route setting unit 56, and the overhang determination unit 58 may be included in the control device 28 of the moving object 10.

Work Content Acquisition Unit and Moving Object Selection Unit

The work content acquisition unit 50 acquires information of the work content determined by the management system 12, in other words, information of the conveyance target pallet P. The moving object selection unit 52 selects a target moving object 10. The moving object selection unit 52 selects the target moving object 10, for example, from among a plurality of moving objects belonging to the facility W. The moving object selection unit 52 may select the target moving object 10 by any method.

Target Object Information Acquisition Unit and Sensor

Figure 5:
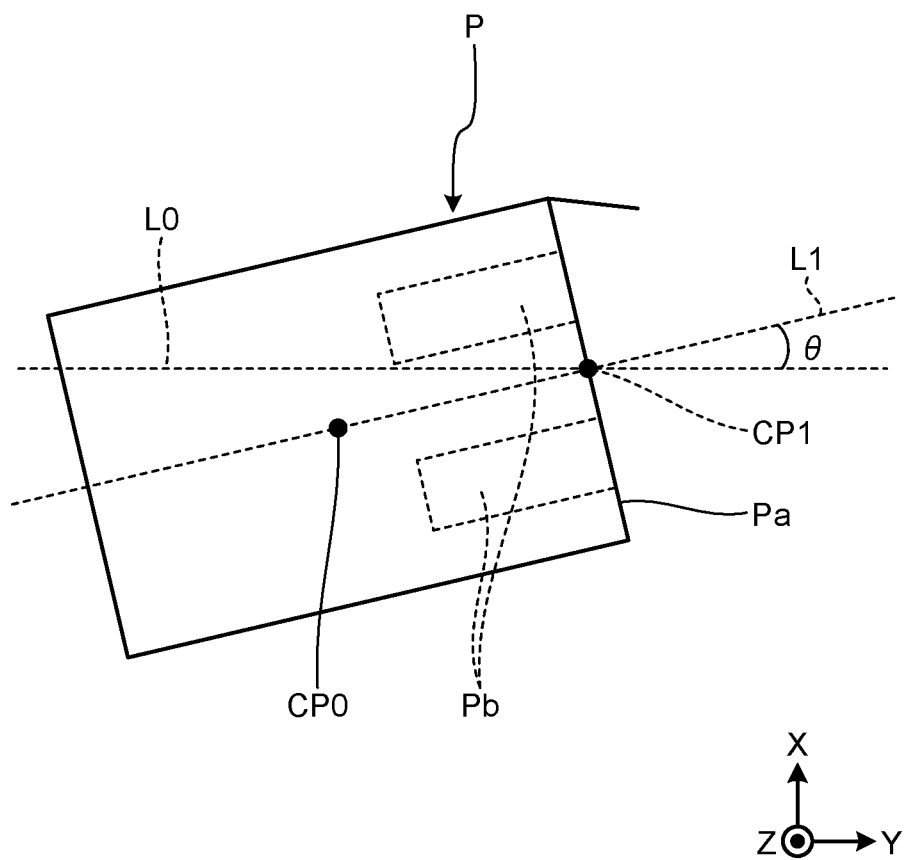
FIG. 5 is a schematic diagram for describing the position and orientation of a pallet.

FIG. 5 is a schematic diagram for describing the position and orientation of the pallet. The target object information acquisition unit 54 acquires a detection result of position information of the pallet P (position information of the target object) from the sensor 16. The target object information acquisition unit 54 may acquire the detection result of the position information of the pallet P from the sensor 16 through wireless or wired communication. The position information of the pallet P is information related to the position and orientation of the pallet P. As illustrated in FIG. 5, the opening Pb into which the fork 24 is inserted is formed at a front surface Pa as one surface (side surface) of the pallet P. In the present embodiment, the position information of the pallet P is information indicating the position and orientation of the pallet P. The position of the pallet P is the position of the pallet P in the facility W, and, for example, two-dimensional coordinates in the X and Y directions in the region A in the facility W. The position of the pallet P may be coordinates at any position on the pallet P such as a central point CP0 of the pallet P or the opening Pb of the pallet P. Hereinafter, a position means two-dimensional coordinates in the region A unless otherwise stated. The orientation (posture) of the pallet P means a direction in which the pallet P faces in the horizontal direction. A straight line L0 is defined to be a reference line in the horizontal direction (in other words, orthogonal to the Z direction), and a straight line L1 is defined to be a straight line that is orthogonal to the Z direction and connects the central point CP0 of the pallet P and a middle point CP of the front surface Pa of the pallet P in the horizontal direction. In this case, for example, the orientation of the pallet P means the tilt of the straight line L1 relative to the straight line L0, in other words, an angle θ between the straight line L0 and the straight line L1. In the example illustrated in FIG. 5, the straight line L0 as a reference line is a straight line in the Y direction but is not limited thereto.

Figure 6:
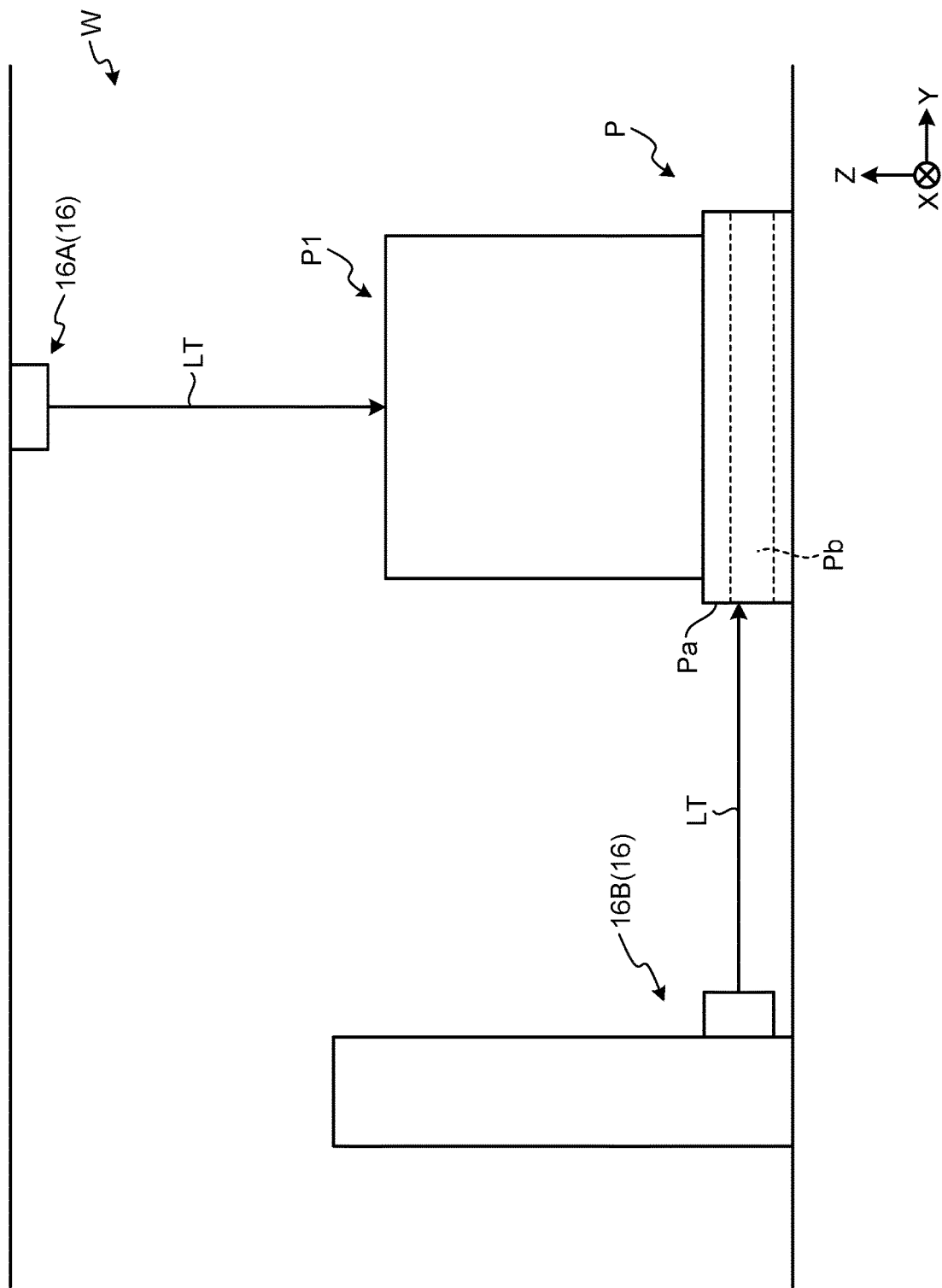
FIG. 6 is a schematic diagram illustrating an exemplary installation position of a sensor.

FIG. 6 is a schematic diagram illustrating an exemplary installation position of the sensor. The sensor 16 detects the position and orientation of an object in the facility W and detects the position information of the pallet P. The sensor 16 is not a sensor provided to the moving object 10 that conveys the pallet P but is a sensor provided in a place other than to the moving object 10. The sensor 16 in the present embodiment emits a laser beam LT toward an object (in this example, the pallet P), receives reflected light of the laser beam LT from the object, and detects position information of the object. More specifically, the sensor 16 of the present embodiment is a two-dimensional light detection and ranging (LIDAR) sensor and emits the laser beam LT while scanning in one direction (in this example, the horizontal direction). However, the sensor 16 is not limited to that described above but may be a sensor configured to detect the position information of the pallet P by any method and may be, for example, a camera.

In the present embodiment, the sensor 16 is fixed to the facility W but may be provided to a moving object other than the moving object 10 like another exemplary sensor to be described later. In the present embodiment, the sensor 16 is provided for each predetermined region in the facility W but is not limited thereto and may be provided for each facility W. The number of sensors 16 may be any number, but in the present embodiment, a plurality of sensors 16 are provided, and for example, a plurality of sensors 16 are provided for predetermined regions, respectively. A position at which each sensor 16 is provided may be any position, but in the present embodiment, at least one of an upper sensor 16A provided on the Z direction side of (vertically above) the pallet P and a side sensor 16B provided on a side of the pallet P (the horizontal direction) is provided as the sensor 16. The upper sensor 16A is provided on, for example, a ceiling of the facility W. The upper sensor 16A emits the laser beam LT toward a surface of the pallet P on the Z direction side (upper side in the vertical direction) by emitting the laser beam LT downward in the vertical direction. The side sensor 16B is provided to, for example, a wall or column of the facility W. The side sensor 16B emits the laser beam LT toward a side surface of the pallet P by emitting the laser beam LT in the horizontal direction. The upper sensor 16A and the side sensor 16B can detect at least information related to the orientation of the pallet P. At least one of the upper sensor 16A and the side sensor 16B can detect information related to the position of the pallet P. When the pallet P and the package P1 have substantially equal sizes or when the package P1 is disposed at a central position of the pallet P, the package P1 may be sensed in place of the pallet P to acquire position information of the package P1. In other words, the position information of the pallet P may be the position information of the pallet P itself or the position information of the package P1 installed on the pallet P.

Figure 7:
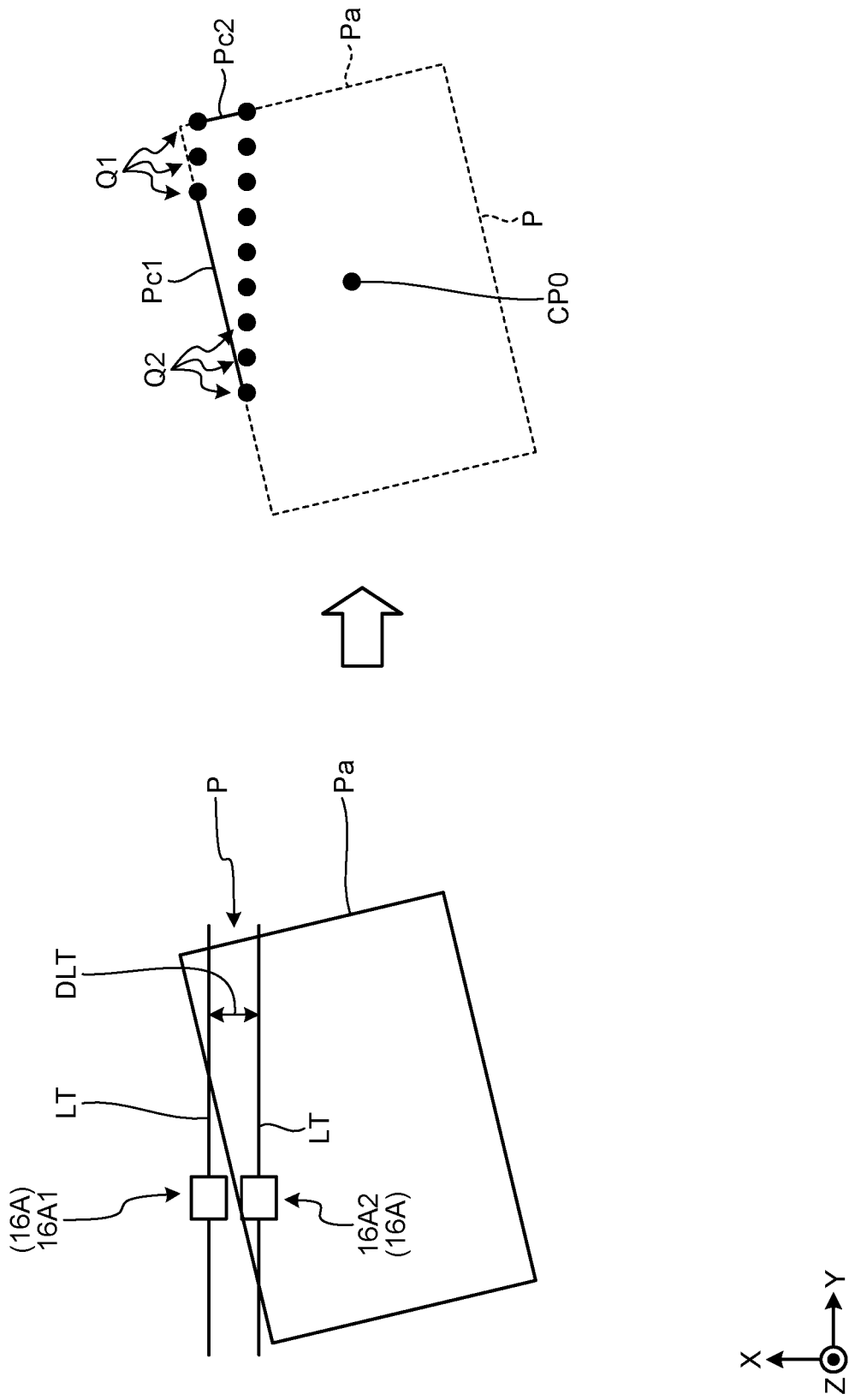
FIG. 7 is a diagram illustrating exemplary detection of position information of the pallet by the sensor.

The following describes an exemplary method of detection of the position information of the pallet P by the sensor 16. FIG. 7 is a diagram illustrating exemplary detection of the position information of the pallet by the sensor. In the example illustrated in FIG. 7, a plurality of upper sensors 16A are provided as the sensor 16. Upper sensors 16A1 and 16A2 each emit the laser beam LT downward in the vertical direction while scanning through different loci. The laser beams LT from the upper sensors 16A1 and 16A2 are emitted to different positions on the upper surface of the pallet P in the Z direction (vertical direction). In other words, the upper sensors 16A1 and 16A2 emit the laser beams LT to different positions on the surface of the pallet P on the Z direction side while scanning in one direction. The upper sensors 16A1 and 16A2 performs scanning with the laser beams LT in the horizontal direction. The directions of scanning of the laser beams LT by the upper sensors 16A1 and 16A2 are parallel to each other in the example illustrated in FIG. 7 but may intersect each other. A shortest distance DLT between a position at which the laser beam LT is emitted on the pallet P by the upper sensor 16A1 and a position at which the laser beam LT is emitted on the pallet P by the upper sensor 16A2 is preferably sufficiently short and for example, preferably shorter than a side (for example, a short side) of the pallet P.

The upper sensor 16A1 receives, from the surface of the pallet P on the Z direction side, reflected light of the laser beam LT emitted by the upper sensor 16A1. The upper sensor 16A1 acquires points Q1 of reflected light from the surface of the pallet P on the Z direction side. The points Q1 are arranged in the scanning direction of the upper sensor 16A1. Similarly, the upper sensor 16A2 receives, from the surface of the pallet P on the Z direction side, reflected light of the laser beam LT emitted by the upper sensor 16A2, and acquires points Q2 of reflected light from the surface of the pallet P on the Z direction side. The points Q2 are arranged in the scanning direction of the upper sensor 16A2. The target object information acquisition unit 54 of the arithmetic device 14 acquires information of the points Q1 and Q2 (information of coordinates of the points Q1 and Q2). In addition, the target object information acquisition unit 54 reads information of predetermined dimensions of the pallet P from, for example, the storage unit 42. The target object information acquisition unit 54 calculates the position and orientation of the pallet P based on the information of the points Q1 and Q2 and information of the dimensions of the pallet P. In the example illustrated in FIG. 7, the farthermost points Q1 and Q2 on one side (side opposite the Y direction) indicate the position of a side end of the pallet P on the one side (side opposite the Y direction), and the farthermost points Q1 and Q2 on the other side (the Y direction side) indicate the position of a side end of the pallet P on the other side (the Y direction side). Thus, a straight line Pct connecting the farthermost points Q1 and Q2 on the one side indicates at least a partial interval of a side of the pallet P on the one side, and a straight line Pc2 connecting the farthermost points Q1 and Q2 on the other side indicates at least a partial interval of a side of the pallet P on the other side. Thus, once the straight lines Pc1 and Pc2 are determined, the position and outline of the pallet P can be estimated based on information of the dimensions of the pallet P, and the orientation of the pallet P can be calculated based on the outline. In this manner, in the example illustrated in FIG. 7, the target object information acquisition unit 54 calculates the positions and orientations of the straight lines Pc1 and Pc2 and then calculates the position and orientation of the pallet P based on the positions and orientations of the straight lines Pc1 and Pc2 and information of the dimensions of the pallet P.

The method of detection of the position and orientation of the pallet P by the upper sensor 16A is not limited to the above-described method but may be another detection method. When a plurality of upper sensors 16A are provided as in the example illustrated in FIG. 7, no side sensor 16B need to be provided. Although the two upper sensors 16A are provided in the example illustrated in FIG. 7, three upper sensors 16A or more may be provided. The number of sensors can be reduced by providing the two upper sensors 16A, and the accuracy of detecting the position information of the pallet P can be improved by providing three upper sensors 16A or more.

FIG. 8 is a diagram illustrating other exemplary detection of the position information of the pallet by the sensor. In the example illustrated in FIG. 8, the side sensor 16B is provided as the sensor 16. The side sensor 16B emits the laser beam LT toward the horizontal direction side while scanning. The laser beam LT from the side sensor 16B is emitted to a side surface of the pallet P. In other words, the side sensor 16B emits the laser beam LT to the side surface of the pallet P while scanning in one direction. The side sensor 16B performs scanning with the laser beam LT in the horizontal direction.

The side sensor 16B receives, from the side surface of the pallet P, reflected light of the laser beam LT emitted by the side sensor 16B. The side sensor 16B acquires points Q of reflected light from the side surface of the pallet P. The target object information acquisition unit 54 of the arithmetic device 14 acquires information of the points Q (information of coordinates of the points Q). In addition, the target object information acquisition unit 54 reads information of predetermined the dimensions of the pallet P from, for example, the storage unit 42. The target object information acquisition unit 54 calculates the position and orientation of the pallet P based on the information of the points Q and information of the dimensions of the pallet P. In the example illustrated in FIG. 8, a farthermost point Qa on the one side (the X direction side) indicates the position of an apex of the pallet P on one side (the X direction side) when viewed in the Z direction, and a farthermost point Qb on the other side (side opposite the X direction) indicates the position of an apex of the pallet P on the other side (side opposite the X direction) when viewed in the Z direction. In addition, a point Qc where the direction of arrangement is changed indicates the position of a third apex of the pallet P when viewed in the Z direction. Thus, a straight line Pd1 passing through points Q from the point Qa to the point Qc indicates one side of the pallet P, and a straight line Pd2 passing through points Q from the point Qb to the point Qc indicates another side of the pallet P. Thus, once the straight lines Pd1 and Pd2 are determined, the position and outline of the pallet P can be estimated based on information of the dimensions of the pallet P, and the orientation of the pallet P can be calculated based on the outline. In this manner, in the example illustrated in FIG. 8, the target object information acquisition unit 54 calculates the positions and orientations of the straight lines Pd1 and Pd2, and then calculates the position and orientation of the pallet P based on the positions and orientations of the straight lines Pd1 and Pd2 and information of the dimensions of the pallet P. When two sides of the pallet P are entirely detected like the straight lines Pd1 and Pd2, the position and orientation of the pallet P can be calculated based on the straight lines Pd1 and Pd2 without using information of the dimensions of the pallet P. However, for example, the sensor 16 detects partial intervals of the two sides of the pallet P or only one side of the pallet P in some cases, and in such a case, the target object information acquisition unit 54 calculates the position and orientation of the pallet P based on the positions and orientations of the partial intervals of the two sides of the pallet P or the position and orientation of the one side, and the position information of the pallet P.

The method of detection of the position and orientation of the pallet P by the side sensor 16B is not limited to the above-described method but may be another detection method. When the side sensor 16B is provided as in the example illustrated in FIG. 8, no upper sensor 16A needs to be provided. However, the side sensor 16B and the upper sensor 16A may be both provided so that, for example, the side sensor 16B detects the orientation of the pallet P and the upper sensor 16A detects the position of the pallet P. Although one side sensor 16B is provided in the example illustrated in FIG. 8, two side sensors 16B or more may be provided. The number of sensors can be reduced by providing one side sensor 16B, and the accuracy of detecting the position information of the pallet P can be improved by providing two side sensors 16B or more.

The arithmetic device 14 may select, based on information of the pallet P, a sensor 16 that detects the position information of the pallet P. In this case, for example, the work content acquisition unit 50 acquires information of an area in which the pallet P is installed from the information of the pallet P. The storage unit 42 stores the pallet P and the information of the area in which the pallet P is installed (position information of the area) in association with each other, and the work content acquisition unit 50 acquires the area information by reading the information from the storage unit 42. The work content acquisition unit 50 selects a sensor 16 capable of detecting the position information of the pallet P in the area based on the area information. The target object information acquisition unit 54 causes the sensor 16 selected by the work content acquisition unit 50 to acquire the position information of the pallet P. The area means at least a partial region in the facility W and may have any size, and for example, may be a region larger than the above-described installation region or may be the installation region itself.

Route Setting Unit

The route setting unit 56 illustrated in FIG. 4 sets the route R to the target position-posture AR1 based on the position information of the pallet P acquired by the target object information acquisition unit 54. First, the route setting unit 56 sets the target position-posture AR1 based on the position information of the pallet P acquired by the target object information acquisition unit 54, in other words, based on the position and orientation of the pallet P. Specifically, the route setting unit 56 calculates, based on the position and orientation of the pallet P, a position and a posture at which the pallet P can be picked up (at which the fork 24 can be inserted into the opening Pb of the pallet P through straight travel) and sets the calculated position and posture as the target position-posture AR1. For example, the target position-posture AR1 may be set to be a place translated by 1000 mm from the entrance of the opening Pb in the axial direction of the opening Pb of the pallet P. The route setting unit 56 generates, as the route R, a path from a start position set in advance to the set target position-posture AR1 based on map information of the facility W. The map information of the facility W is information including position information of an obstacle (such as a column) installed in the facility W, a path on which the moving object 10 can travel, and the like, and is information indicating a region in which the moving object 10 can move in the region A. The route setting unit 56 may set the route R based on information of vehicle specifications of the moving object 10 in addition to the map information of the facility W. The information of the vehicle specifications is specifications that affect a path on which the moving object 10 can move, such as the size and minimum rotational radius of the moving object 10. The route setting unit 56 may specify, for example, a point (waypoint) to be passed, and in this case, can generate, as the route R, a path that is shortest from the start position to the target position-posture AR1 through the point to be passed and avoids an obstacle (fixed object such as a wall). Alternatively, the route setting unit 56 may acquire the current position of the moving object 10 from the moving object 10 and may set, as the route R, a path from the current position of the moving object 10 to the target position-posture AR1.

When the pallet P is installed in the installation region set in advance, a path to the installation region is set in advance in some cases. In such a case, the route setting unit 56 may read the path to the installation region from the storage unit 42 and generate the route R, making the difference from the path to the installation region the smallest.

Overhang Determination Unit

Figure 9:
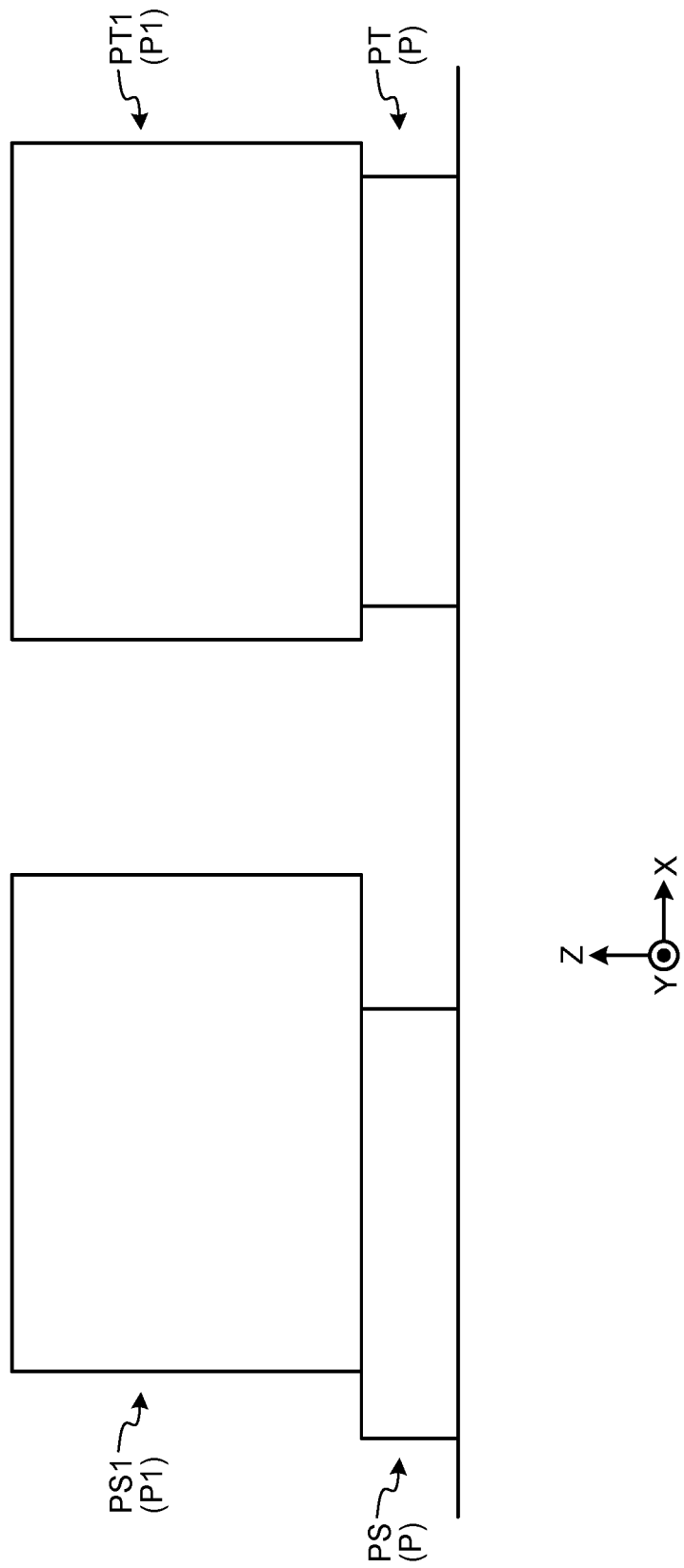
FIG. 9 is a diagram illustrating exemplary overhang of a package from the pallet.

FIG. 9 is a diagram illustrating exemplary overhang of the package from the pallet. The overhang determination unit 58 illustrated in FIG. 4 determines whether the package P1 overhangs from the pallet P based on a result of detection by the sensor 16. The sensor 16 detects the position of a side surface of the pallet P and the position of the side surface of the package P1. The method by which the sensor 16 detects the position of the side surface of the pallet P and the position of the side surface of the package P1 may be any method, and for example, the position of the side surface of the pallet P and the position of the side surface of the package P1 may be detected by scanning the side surface of the pallet P and the side surface of the package P1 through the side sensor 16B by a method same as in the description of FIG. 7. The overhang determination unit 58 determines whether the package P1 overhangs from the pallet P based on the position of the side surface of the pallet P and the position of the side surface of the package P1. For example, when the side surface of the package P1 is positioned outside (side farther away from the center of the pallet P) the side surface of the pallet P, the overhang determination unit 58 determines that the package P1 overhangs from the pallet P, or when the side surface of the package P1 is positioned inside (center side of the pallet P) the side surface of the pallet P, the overhang determination unit 58 determines that the package P1 does not overhang from the pallet P. The method of determining whether the package P1 overhangs based on the result of detection by the sensor 16 is not limited to the above-described method and may be any method. For example, detection may be performed from above the pallet P by the upper sensor 16A to detect the size of an object when viewed from above in the vertical direction. In this case, when the detected size of the object is larger than the known size of the pallet P, the overhang determination unit 58 may determine that the size of the package P1 as the object overhanging from the pallet P is detected and may determine that the package P1 overhangs from the pallet P.

The overhang determination unit 58 may also determine whether the package P1 is installed being shifted relative to the pallet P. In this case, for example, the sensor 16 detects the positions of a plurality of side surfaces of the pallet P and the positions of a plurality of side surfaces of the package P1. For example, as illustrated with a pallet PS and a package PS1 in FIG. 9, when one side surface of the package PS1 is positioned outside one side surface of the pallet PS and the other side surface of the package PS1 is positioned inside the other side surface of the pallet PS, the overhang determination unit 58 determines that the package P1 overhangs from the pallet P and the package P1 is installed being shifted relative to the pallet P. For example, as illustrated with a pallet PT and a package PT1 in FIG. 9, when one side surface of the package PT1 is positioned outside one side surface of the pallet PT and the other side surface of the package PT1 is positioned outside the other side surface of the pallet P, the overhang determination unit 58 determines that the package P1 overhangs from the pallet P but the package P1 is installed not being shifted relative to the pallet P. The method of determining whether the package P1 is installed being shifted relative to the pallet P is not limited to the above-described method but may be any method. For example, detection may be performed from above the pallet P by the upper sensor 16A to detect the size of an object when viewed from above in the vertical direction. In this case, when the detected size of the object is larger than the known size of the pallet P, the overhang determination unit 58 may determine that the entire size including the pallet P and the package P1 overhanging from the pallet P is detected, and may determine that the package P1 is installed being shifted relative to the pallet P.

Information Output Unit

The information output unit 60 illustrated in FIG. 4 outputs information. The information output unit 60 outputs information to the moving object 10 through a communication unit (not illustrated) of the arithmetic device 14. The information output unit 60 transmits information of the route R generated by the route setting unit 56 to the moving object 10. The information output unit 60 also transmits a result of determination by the overhang determination unit 58 to the moving object 10. For example, when the overhang determination unit 58 determines that the package P1 is installed being shifted relative to the pallet P, the information output unit 60 may output information (alert) indicating that the package P1 is installed being shifted relative to the pallet P. When the package P1 is installed being shifted relative to the pallet P, the package P1 is more likely to fall while the pallet P is conveyed, and thus the moving object 10 is prevented from executing conveyance, and information thereof is output. This allows the shift to be dealt with, for example, allows a worker to mount the package P1 again. When the target object information acquisition unit 54, the route setting unit 56, and the overhang determination unit 58 are included in the control device 28 of the moving object 10, the target object information acquisition unit 54 of the moving object 10 acquires the position information of the pallet P directly from the sensor 16. Then, the route setting unit 56 of the moving object 10 sets the route R based on the position information of the pallet P, and the overhang determination unit 58 of the moving object 10 executes determination based on the position information of the pallet P. The arithmetic device 14 acquires information of the route R set by the route setting unit 56 of the moving object 10 and a result of the determination by the overhang determination unit 58.

Control Device of Moving Object

Figure 10:
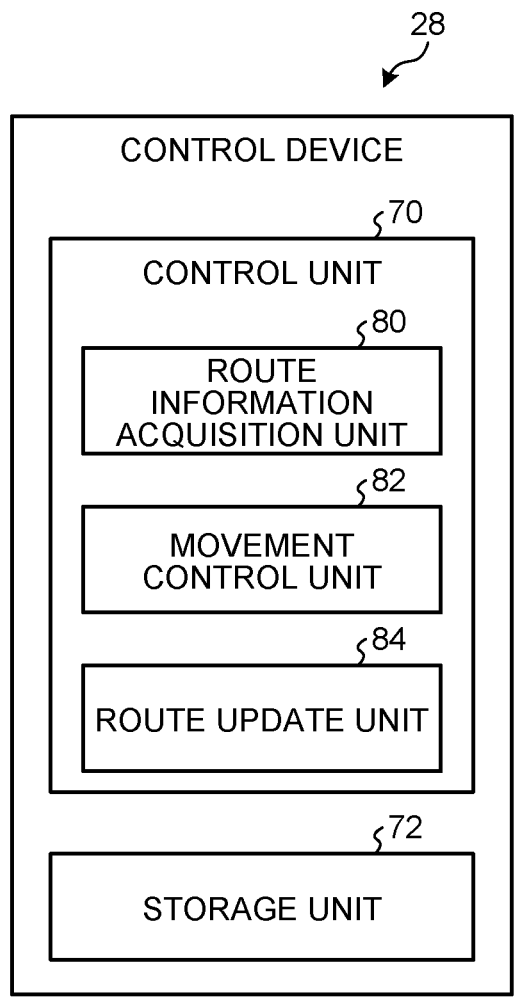
FIG. 10 is a schematic block diagram of a control device of the moving object.

FIG. 10 is a schematic block diagram of the control device of the moving object. The control device 28 controls the moving object 10. The control device 28 moves the moving object 10 to the target position-posture AR1 along the route R generated by the arithmetic device 14, and causes the moving object 10 to pick up the pallet P. The control device 28 is a computer including a control unit 70 and a storage unit 72 as illustrated in FIG. 10. The storage unit 72 is a memory configured to store various kinds of information such as the contents of calculation by the control unit 70 and computer programs and includes, for example, at least one of a RAM, a main storage device such as a ROM, and an external storage device such as an HDD.

The control unit 70 is an arithmetic device, in other words, a CPU. The control unit 70 includes a route information acquisition unit 80, a movement control unit 82, and a route update unit 84. The control unit 70 achieves the route information acquisition unit 80, the movement control unit 82, and the route update unit 84 and executes processing thereof by reading a computer program (software) from the storage unit 72 and executing the computer program. The control unit 70 may execute processing with one CPU or may include a plurality of CPUs and execute processing with the CPUs. At least part of the route information acquisition unit 80, the movement control unit 82, and the route update unit 84 may be achieved by a hardware circuit.

The route information acquisition unit 80 acquires information of the route R from the arithmetic device 14. The movement control unit 82 controls movement of the moving object 10 by controlling movement mechanisms such as a drive unit and a steering of the moving object 10. The movement control unit 82 moves the moving object 10 in accordance with the route R acquired by the route information acquisition unit 80. Specifically, the movement control unit 82 moves the moving object 10 from the current position of the moving object 10 toward the target position-posture AR1 through the route R. The movement control unit 82 moves the moving object 10 through the route R by sequentially determining position information of the moving object 10. The method of acquiring the position information of the moving object 10 may be any method, but for example, in the present embodiment, detection bodies S are provided in the facility W, as illustrated in FIG. 1, and the movement control unit 82 acquires the position information of the moving object 10 based on detection of the detection bodies S. Specifically, the moving object 10 detects the position of the moving object 10 in the facility W by emitting a laser beam toward each detection body S and receiving reflected light of the laser beam from the detection body S.

When the moving object 10 has arrived at the target position-posture AR1, the movement control unit 82 moves the moving object 10 from the target position-posture AR1 to the position of the pallet P, inserts the fork 24 into an opening Pb2 of the pallet P, and picks up the pallet P. Then, the movement control unit 82 moves the moving object 10 having picked up the pallet P to a conveyance destination.

The route update unit 84 updates the route R based on a result of detection by the sensor 26 of the moving object 10. The sensor 26 detects the position information of the pallet P and the position of the opening Pb. The route update unit 84 causes the sensor 26 to continue detection, for example, during traveling in accordance with the route R. Then, when the moving object 10 has arrived nearby the pallet P, in other words, when the moving object 10 has arrived at a distance within which the pallet P can be detected by the sensor 26, the route update unit 84 acquires the position information of the pallet P and the position information of the opening Pb from the sensor 26. However, the route update unit 84 may start detection by the sensor 26 after the moving object 10 arrives at a position where detection by the sensor 26 is possible. For example, the sensor 26 detects the position information of the pallet P and the position of the opening Pb by emitting a laser beam toward the front surface Pa of the pallet P while scanning in one direction (the horizontal direction), and receiving reflected light of the laser beam from the pallet P.

The route update unit 84 acquires the position information of the pallet P and a detection result of the position of the opening Pb and determines whether the pallet P can be picked up through the current route R. The route update unit 84 specifies the position of the opening Pb based on the position information of the pallet P and the detection result of the position of the opening Pb by the sensor 26. Then, the route update unit 84 determines, based on the specified position of the opening Pb, whether the fork 24 can be inserted into the opening Pb2 of the pallet P when the moving object 10 has arrived at the target position-posture AR1 through the route R. For example, when the fork 24 can be inserted into the opening Pb2 as the moving object 10 travels straight from the target position-posture AR1, the route update unit 84 determines that the fork 24 can be inserted into the opening Pb2. When having determined that the fork 24 can be inserted into the opening Pb2, the route update unit 84 determines that the pallet P can be picked up through the current route R. When having determined that the fork 24 cannot be inserted into the opening Pb2, the route update unit 84 determines that the pallet P cannot be picked up through the current route R.

When having determined that the pallet P can be picked up through the current route R, the route update unit 84 does not update the route R. When having determined that the pallet P cannot be picked up through the current route R, the route update unit 84 updates the route R based on the position information of the pallet P and the detection result of the position of the opening Pb so that the target position-posture AR1 is a position at which the pallet P can be picked up. The route update unit 84 may generate, by model predictive control (MPC), the route R to the target position-posture AR1 at which the pallet P can be picked up. The route update unit 84 may be included in the arithmetic device 14, and the route R may be updated by the route update unit 84 of the arithmetic device 14. In this case, the moving object 10 acquires information of the updated route R from the arithmetic device 14.

When the route update unit 84 has updated the route R, the movement control unit 82 moves the moving object 10 through the updated route R. The movement control unit 82 may move the moving object 10 to the target position-posture AR1 while performing switching between movement along the route R and movement by direct feedback control. The direct feedback control is, for example, control by a visual servoing scheme as disclosed in "Atsushi Ozato and Noriaki Maru, "Position and Orientation Control of Omnidirectional Mobile Robot by Linear Visual Servoing", Transactions of the Japan society of mechanical engineers (C), Vol. 77, No. 774, p. 215-224, Feb. 25, 2011".

The movement control unit 82 may acquire a result of determination by the overhang determination unit 58 from the arithmetic device 14 and may control travel of the moving object 10 based on the result of determination by the overhang determination unit 58. For example, when the overhang determination unit 58 determines that the package P1 overhangs from the pallet P, the movement control unit 82 can prevent fall of the package P1 through speed reduction or the like. In addition, a path to a conveyance destination can be set with overhang of the package P1 taken into consideration so that the package P1 does not interfere with an obstacle.

Movement Control Process

Figure 11:
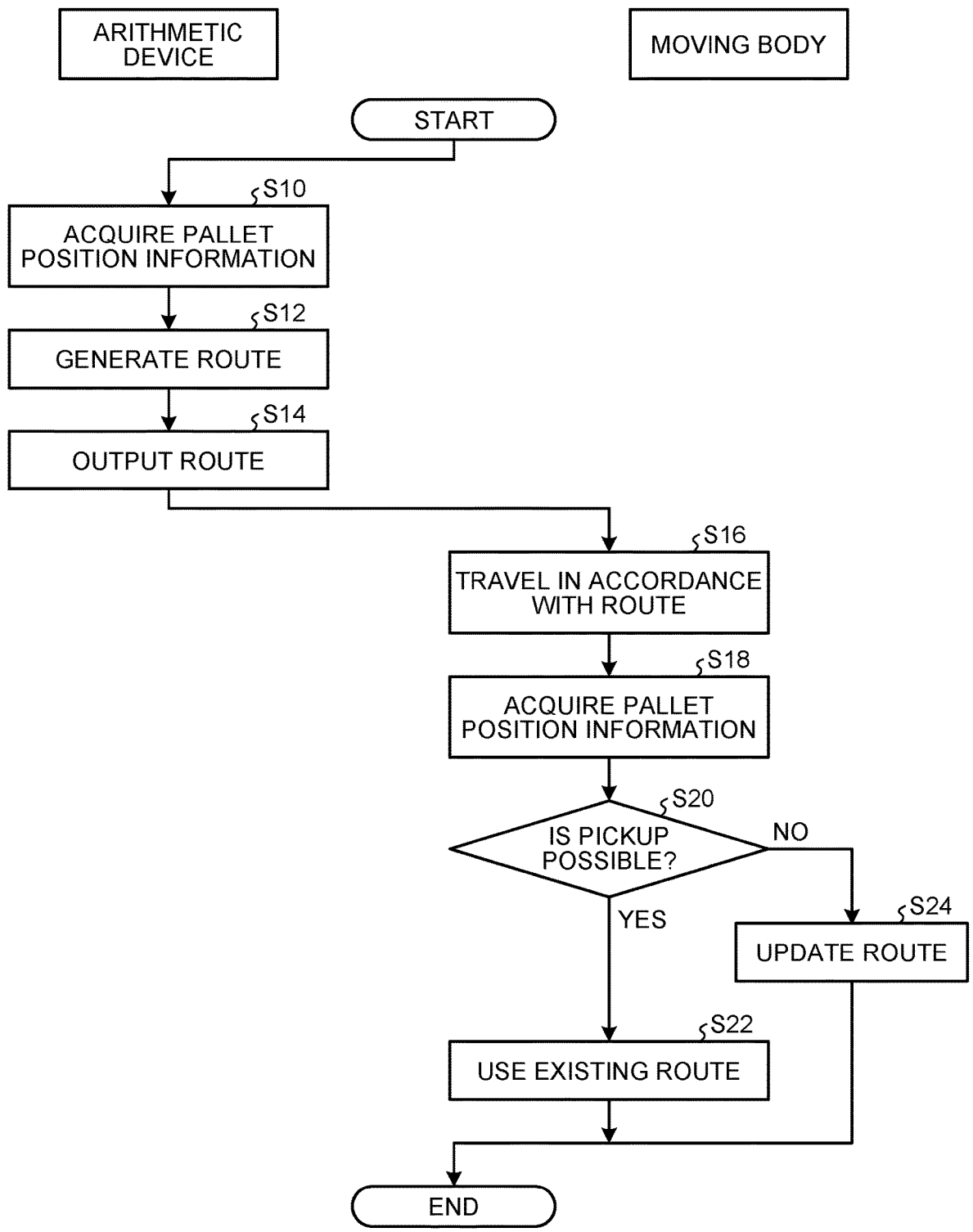
FIG. 11 is a flowchart for describing the process of moving-object movement control according to the first embodiment.

The following describes the process of the above-described movement control of the moving object 10 based on a flowchart. FIG. 11 is a flowchart for describing the process of movement control of the moving object according to the first embodiment. As illustrated in FIG. 11, the arithmetic device 14 acquires, by the target object information acquisition unit 54, the position information of the pallet P from the sensor 16 (step S10) and generates, by the route setting unit 56, the route R to the target position-posture AR1 based on the position information of the pallet P (step S12). The arithmetic device 14 outputs, by the information output unit 60, the generated route R to the moving object 10 (step S14).

Having acquired information of the route R from the arithmetic device 14, the moving object 10 travels in accordance with the route R under control of the movement control unit 82 (step S16). Then, when having traveled on the route R and reached a position at which the pallet P can be detected by the sensor 26, the moving object 10 acquires, by the route update unit 84, the position information of the pallet P and the position of the opening Pb from the sensor 26 (step S18). The route update unit 84 determines, based on the position information of the pallet P and the position of the opening Pb, whether the moving object 10 can pick up the pallet P when having traveled on the route R and arrived at the target position-posture AR1 (step S20). When it is determined that the moving object 10 can pick up the pallet P (Yes at step S20), the moving object 10 uses the existing route R without updating the route R and continues traveling in accordance with the existing route R (step S22). When it is determined that the moving object 10 cannot pick up the pallet P (No at step S20), the route update unit 84 updates the route R (step S24) and the moving object 10 travels on the updated route R. When having arrived at the target position-posture AR1, for example, the moving object 10 travels straight, picks up the pallet P, and conveys the pallet P to another place.

Effects of the Present Embodiment

A route on which the moving object 10 moves to the pallet P is set in advance in some cases. However, when the pallet P is disposed at any position or the pallet P is not installed at a determined position, it is difficult to set the route in advance. In such a case, it is possible to move the moving object 10 close to the pallet P, sense the pallet P by the sensor 26, and generate a trajectory, but in a case in which the position of the pallet P is not determined, a trajectory calculation load is high, calculation takes time, and work is potentially delayed. In addition, the control device of the moving object 10 needs high performance in some cases. Furthermore, an object cannot be appropriately sensed, depending on the resolution and azimuth angle of the sensor 16. Thus, the route R through which the pallet P can be appropriately picked up needs to be generated. With the arithmetic device 14 according to the present embodiment, the position and orientation of the conveyance target pallet P are detected by the sensor 16 provided in a place other than to the moving object 10, and the route R to the target position-posture AR1 is generated based on the position and orientation of the pallet P. The route R generated in this manner is based on the position and orientation of the pallet P, and thus is a highly accurate route through which the pallet P can be appropriately picked up. In addition, since the sensor 16 provided in a place other than to the moving object 10 is used, the highly accurate route R can be generated before the moving object 10 starts movement. The moving object 10 approaches the pallet P in accordance with this route R, and thus, for example, when the moving object 10 regenerates the route R to the pallet P, it is possible to reduce a difference from the original route R and reduce a calculation load. Accordingly, with the arithmetic device 14 according to the present embodiment, it is possible to generate the route R through which the pallet P can be appropriately picked up.

As described above, the arithmetic device 14 according to the present embodiment outputs information to the moving object 10 that automatically moves, and includes the target object information acquisition unit 54, the route setting unit 56, and the information output unit 60. The target object information acquisition unit 54 acquires, from the sensor 16 provided in a place other than to the moving object 10, a detection result of position information of the pallet P (target object), the position information being information related to the position and orientation of the pallet P (target object). The route setting unit 56 sets, based on the position information of the pallet P, the route R (path) to the target position-posture AR1 (target position) at which predetermined position and orientation relative to the pallet P are reached. The information output unit 60 outputs information of the route R to the moving object 10. Since the arithmetic device 14 according to the present embodiment generates the route R based on the information related to the position and orientation of the pallet P, which is detected by the sensor 16, it is possible to generate the highly accurate route R through which the pallet P can be appropriately picked up. In addition, since the sensor 16 provided in a place other than to the moving object 10 is used, the highly accurate route R can be generated before the moving object 10 starts movement. Accordingly, with the arithmetic device 14 according to the present embodiment, it is possible to generate the route R through which the pallet P can be appropriately picked up.

The sensor 16 detects the position information of the pallet P by emitting the laser beam LT toward the pallet P and receiving reflected light of the laser beam LT. With the arithmetic device 14 according to the present embodiment, it is possible to set the route R based on the position information of the pallet P detected by the laser beam LT, and thus it is possible to generate the route R through which the pallet P can be appropriately picked up.

The sensor 16 includes at least one of the upper sensor 16A and the side sensor 16B, the upper sensor 16A being provided vertically above the pallet P and configured to detect at least information related to the orientation of the pallet P, the side sensor 16B being provided lateral to the pallet P and configured to detect at least information related to the position of the pallet P. With the arithmetic device 14 according to the present embodiment, it is possible to set the route R based on the information related to the orientation of the pallet P, which is detected by the upper sensor 16A and the side sensor 16B, and thus it is possible to generate the route R through which the pallet P can be appropriately picked up.

The sensor 16 includes a plurality of upper sensors 16A, and the upper sensors 16A emit the laser beams LT to scan respective different positions on a surface of the pallet P on the upper side in the vertical direction with the laser beams LT in one direction, and receives reflected light of the laser beams LT from the surface of the pallet P on the upper side in the vertical direction. The target object information acquisition unit 54 calculates the orientation of the pallet P based on the reflected light received by the respective upper sensors 16A. With the arithmetic device 14 according to the present embodiment, since the upper sensors 16A emit the laser beams LT to the surface of the pallet P on the upper side in the vertical direction, it is possible to highly accurately acquire the position information of the pallet P, and thus it is possible to appropriately generate the route R.

The sensor 16 includes the side sensor 16B, and the side sensor 16B emits the laser beam LT to a side surface of the pallet P while scanning in one direction, receives reflected light of the laser beam LT from the side surface of the target object. The target object information acquisition unit 54 calculates the orientation of the pallet P based on the reflected light received by the side sensor 16B. With the arithmetic device 14 according to the present embodiment, since the side sensor 16B emits the laser beam LT to the side surface of the pallet P, it is possible to highly accurately acquire the position information of the pallet P, and thus it is possible to appropriately generate the route R.

The target object is the pallet P on which the package P1 is mounted, and the arithmetic device 14 further includes the overhang determination unit 58 configured to determine whether the package P1 overhangs from the pallet P based on a result of detection by the sensor 16. With the arithmetic device 14 according to the present embodiment, since it is determined whether the package P1 overhangs from the pallet P, it is possible to improve the accuracy of specifying the pallet P.

The movement control system 1 includes the arithmetic device 14 and the moving object 10. With the movement control system 1 according to the present embodiment, it is possible to generate the route R through which the pallet P can be appropriately picked up.

The control device 28 of the moving object 10 that automatically moves includes the route information acquisition unit 80 and the movement control unit 82. The route information acquisition unit 80 acquires the route R to the target position-posture AR1 at which predetermined position and orientation relative to pallet P are reached, the route R being generated based on the position information of the pallet P, the position information being information related to the position and orientation of the pallet P that are detected by the sensor 16 provided in a place other than to the moving object 10. The movement control unit 82 moves the moving object 10 based on the route R. With the control device 28 according to the present embodiment, since the moving object 10 travels based on the route R, it is possible to appropriately pick up the pallet P.

The moving object 10 according to the present embodiment includes the control device 28. The moving object 10 according to the present embodiment travels based on the route R, and thus can appropriately pick up the pallet P.

A calculation method according to the present embodiment is a calculation method of outputting information to the moving object 10 that automatically moves, the calculation method including: acquiring, from the sensor 16 provided in a place other than to the moving object 10, a detection result of the position information of the pallet P, the position information being information related to the position and orientation of the pallet P; generating, based on the position information of the pallet P, the route R to the target position-posture AR1 at which predetermined position and orientation relative to the pallet P are reached; and outputting information of the route R to the moving object 10. With the calculation method according to the present embodiment, it is possible to generate the route R through which the pallet P can be appropriately picked up.

A computer program according to the present embodiment is a computer program configured to cause a computer to execute a calculation method of outputting information to the moving object 10 that automatically moves, the calculation method including: acquiring, from the sensor 16 provided in a place other than to the moving object 10, a detection result of the position information of the pallet P, the position information being information related to the position and orientation of the pallet P; generating, based on the position information of the pallet P, the route R to the target position-posture AR1 at which predetermined position and orientation relative to the pallet P are reached; and outputting information of the route R to the moving object 10. The computer program according to the present embodiment may be provided by means of a (non-transitory) computer-readable storage medium storing the computer program, including a RAM, a ROM, an HDD.

Another Exemplary System

In the present embodiment, the management system 12 determines a work content indicating information of the pallet P, and the arithmetic device 14 specifies the target moving object 10 and acquires the route R. However, the contents of processing by the management system 12 and the arithmetic device 14 are not limited thereto. For example, the management system 12 may perform at least part of the processing by the arithmetic device 14, and the arithmetic device 14 may perform at least part of the processing by the management system 12. The management system 12 and the arithmetic device 14 may be one device (computer).

Second Embodiment

The following describes a second embodiment. A movement control system 1a according to the second embodiment is different from that of the first embodiment in that the route R to the pallet P mounted on a vehicle V is generated. In the second embodiment, a configuration common to that in the first embodiment is not described below.

Figure 12:
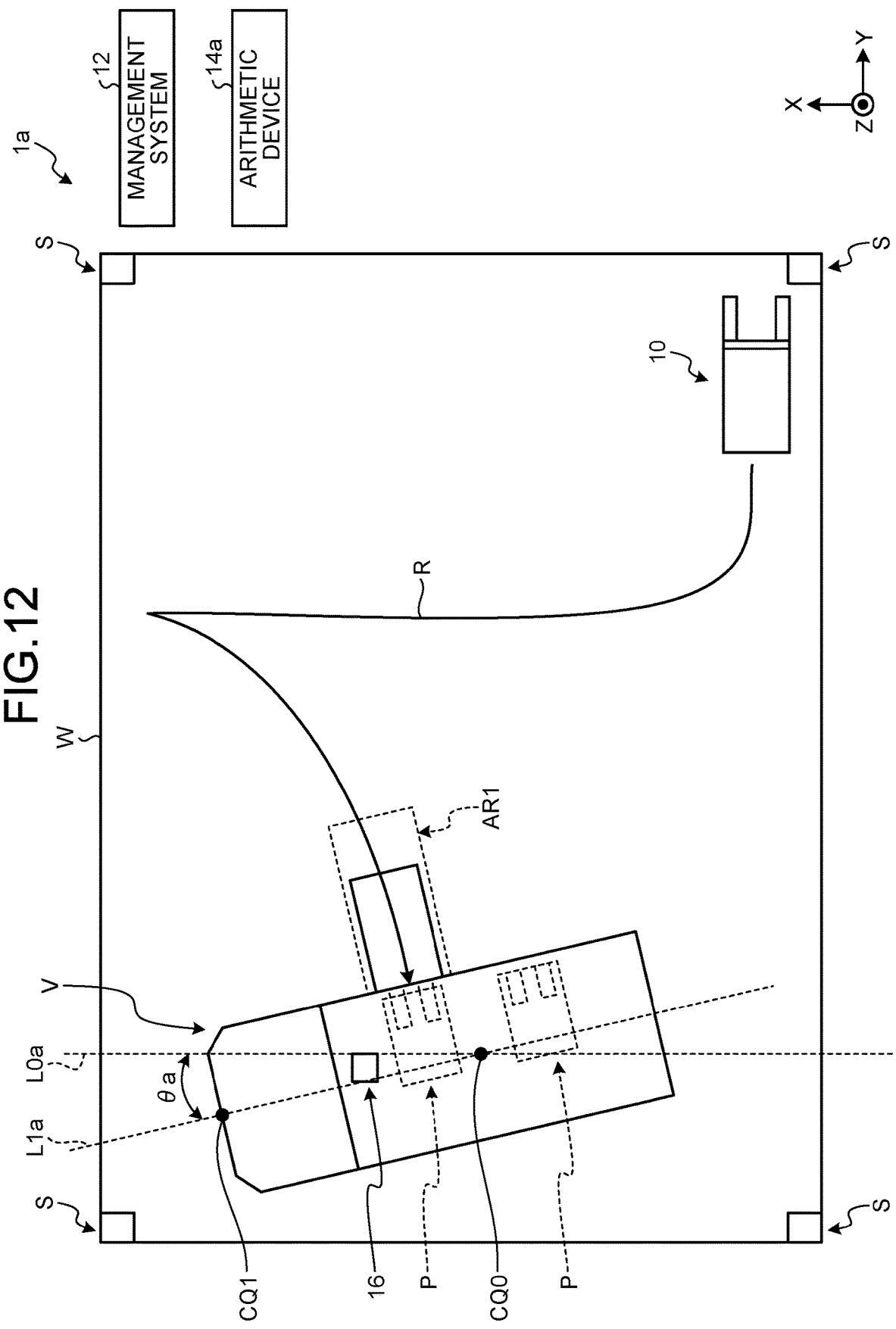
FIG. 12 is a schematic diagram of a movement control system according to a second embodiment.

FIG. 12 is a schematic diagram of the movement control system according to the second embodiment. As illustrated in FIG. 12, the vehicle V is installed in the facility W. The pallet P is mounted in the vehicle V. In the second embodiment, the moving object 10 travels toward the pallet P in the vehicle V in accordance with the route R generated by an arithmetic device 14a.

Figure 13:
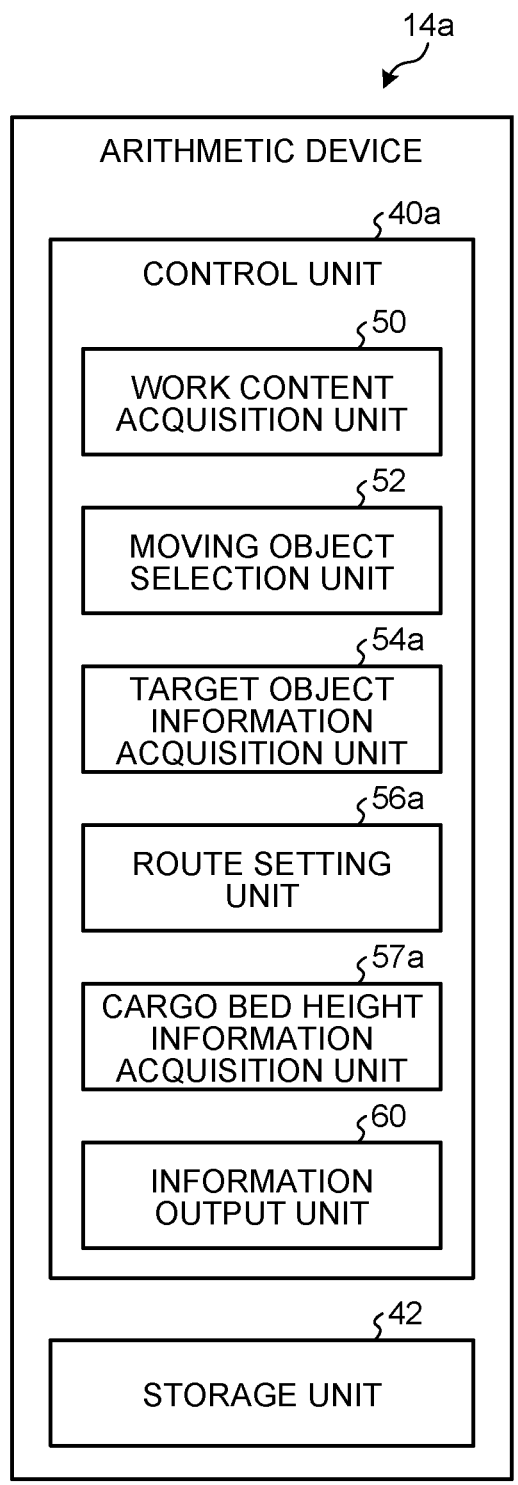
FIG. 13 is a schematic block diagram of an arithmetic device according to the second embodiment.

FIG. 13 is a schematic block diagram of the arithmetic device according to the second embodiment. As illustrated in FIG. 13, a control unit 40a of the arithmetic device 14a includes the work content acquisition unit 50, the moving object selection unit 52, a target object information acquisition unit 54a, a route setting unit 56a, a cargo bed height information acquisition unit 57a, and the information output unit 60.

Vehicle

Figure 14:
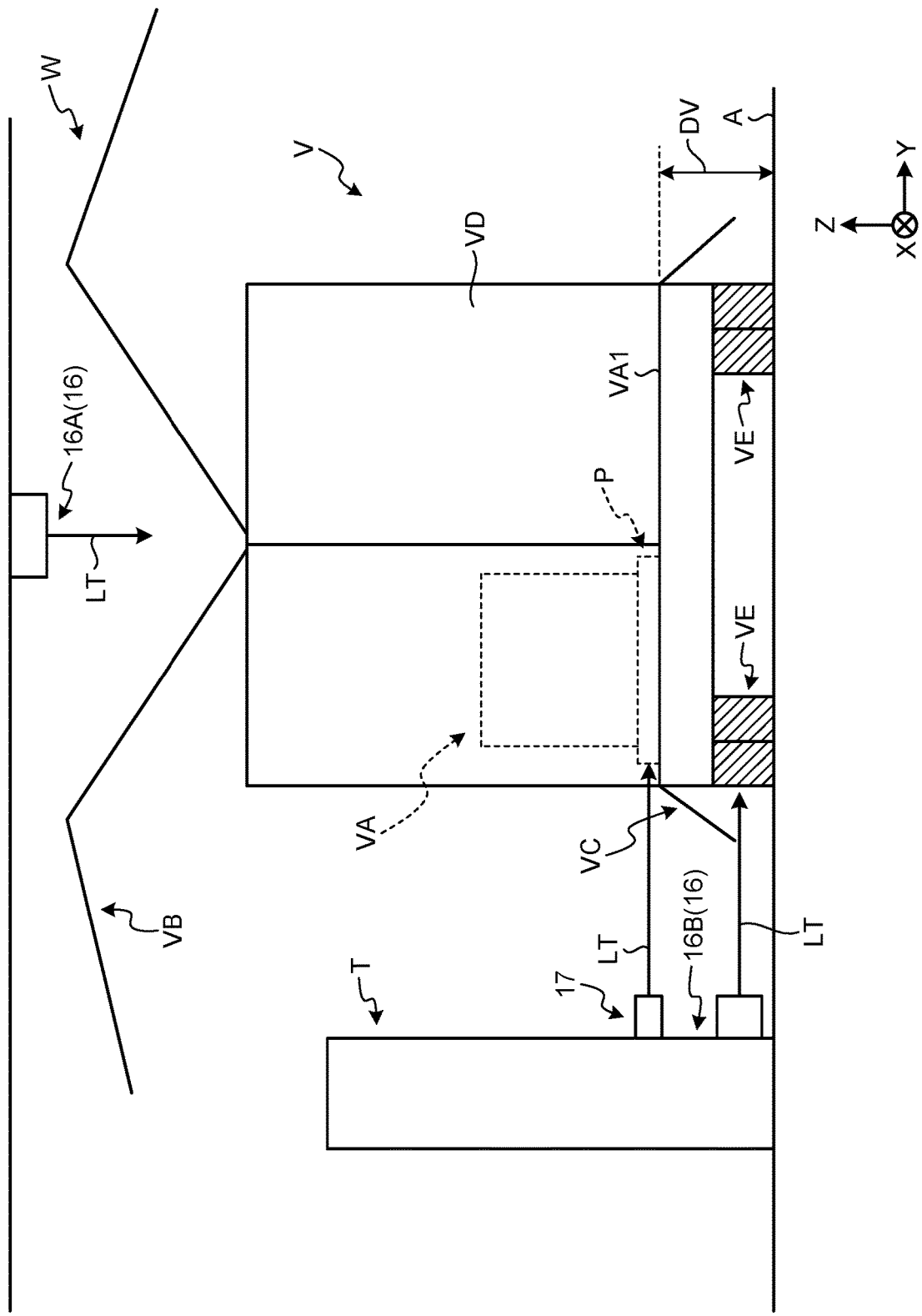
FIG. 14 is a schematic diagram illustrating a vehicle and the pallet.

FIG. 14 is a schematic diagram illustrating the vehicle and the pallet. As illustrated in FIG. 14, the vehicle V includes a housing room VA, a side door VB, a flap part VC, a back door VD, and a tire VE. The housing room VA is a space that is formed on a cargo bed of the vehicle V and in which the pallet P is housed. The side door VB is a door provided on a side of the housing room VA. When the side door VB is opened, the housing room VA is communicated with the outside to allow conveyance of the pallet P. The flap part VC is a gate provided near a bottom surface on a side of the housing room VA. The back door VD is a door provided on a back side of the housing room VA. When the back door VD is opened, the housing room VA is communicated with the outside to allow conveyance of the pallet P. The present embodiment describes an example in which the side door VB is opened to pick up the pallet P in the housing room VA from the side of the vehicle V, but the present invention is not limited to pickup of the pallet P from the side, and for example, the pallet P may be picked up from the back side.

Target Object Information Acquisition Unit and Sensor

The target object information acquisition unit 54a acquires information of the position and orientation of the vehicle V as the position information of the pallet P from the sensor 16. Since the pallet P is mounted in the vehicle V, the position and orientation of the pallet P depend on the position and orientation of the vehicle V. Thus, the information of the position and orientation of the vehicle V is the position information of the pallet P, in other words, information related to the position and orientation of the pallet P. As illustrated in FIG. 14, the position of the vehicle V is the position of the vehicle V in the facility W and is, for example, two-dimensional coordinates in the X and Y directions in the region A in the facility W. The position of the vehicle V may be coordinates at a central point CQ0 of the vehicle V or any position on the vehicle V. The orientation of the vehicle V means a direction in which the vehicle V faces in the horizontal direction. A straight line L0a is defined to be a reference line in the horizontal direction (in other words, orthogonal to the Z direction), and a straight line L1a is defined to be a straight line orthogonal to the Z direction (vertical direction) and connecting the central point CQ0 of the vehicle V and a middle point CQ1 in the horizontal direction on the front surface of the vehicle V. In this case, for example, the orientation of the vehicle V means the tilt of the straight line L1a relative to the straight line L0a, in other words, an angle θa between the straight line L0a and the straight line L1a. In the example of FIG. 13, the straight line L0a as a reference line is, for example, a reference line in the facility W and a straight line in the Y direction, but the direction of the straight line L0a may be any direction.

The sensor 16 according to the second embodiment detects the position and orientation of the vehicle V. As illustrated in FIG. 14, in the second embodiment as well, at least one of the upper sensor 16A and the side sensor 16B may be provided as the sensor 16. The upper sensor 16A emits the laser beam LT toward a surface of the vehicle V on the Z direction side (upper side in the vertical direction) by emitting the laser beam LT downward in the vertical direction. The side sensor 16B emits the laser beam LT toward a side surface of the vehicle V by emitting the laser beam LT toward the horizontal direction side. The upper sensor 16A and the side sensor 16B can detect at least the orientation of the vehicle V (information related to the orientation of the pallet P). At least one of the upper sensor 16A and the side sensor 16B can detect the position of the vehicle V (information related to the position of the pallet P).

Figure 15:
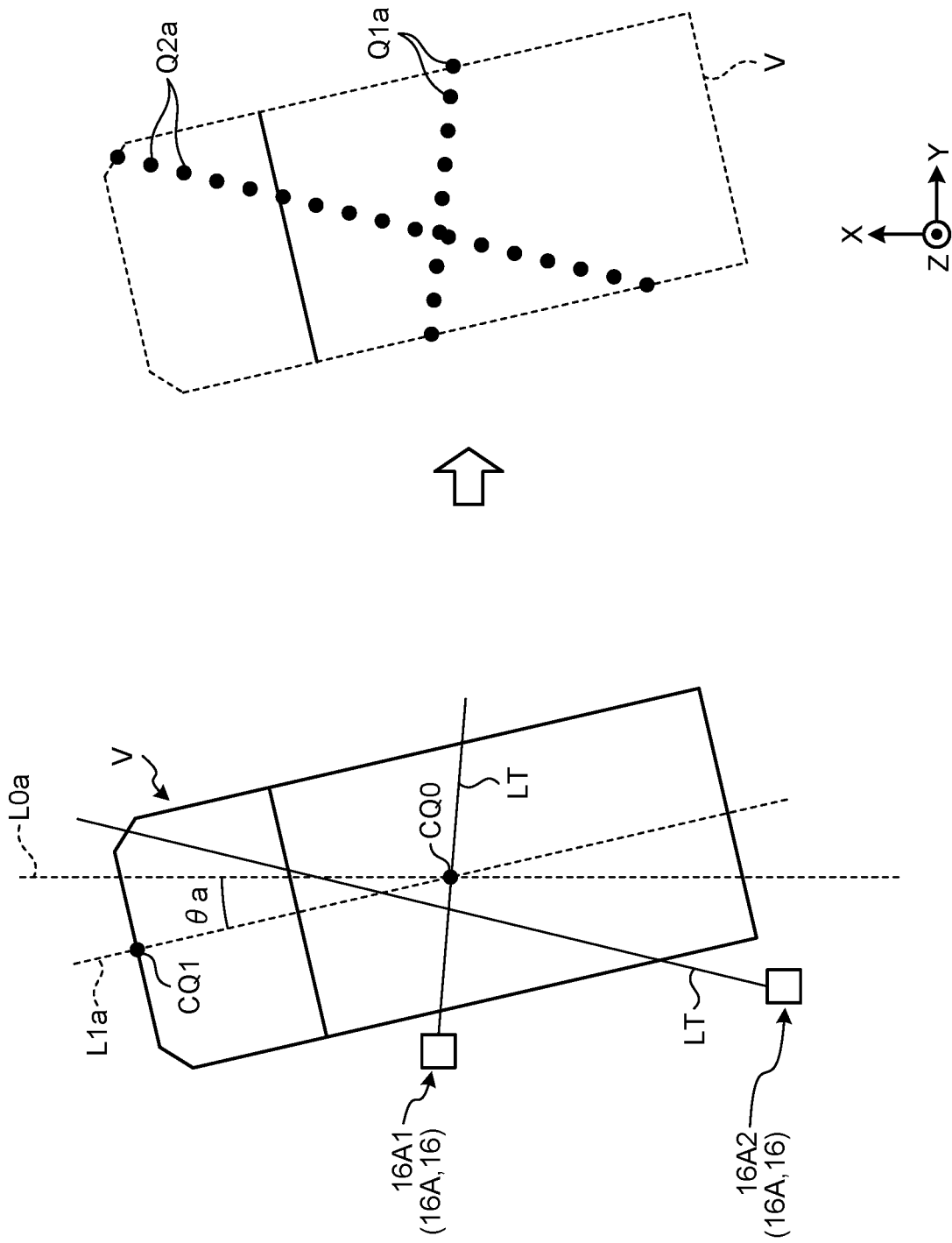
FIG. 15 is a diagram illustrating exemplary detection of the position and orientation of the vehicle by the sensor.

The following describes an exemplary method of detecting the position and orientation of the vehicle V by the sensor 16. FIG. 15 is a diagram illustrating exemplary detection of the position and orientation of the vehicle by the sensor. In the example of FIG. 15, a plurality of upper sensors 16A are provided as the sensor 16 in an installation region AR0. The upper sensors 16A1 and 16A2 emit the laser beams LT downward the vertical direction while scanning through different loci. The laser beams LT from the upper sensors 16A1 and 16A2 are emitted to different positions on the upper surface of the vehicle V in the Z direction (the vertical direction). In other words, the upper sensors 16A1 and 16A2 emit the laser beams LT to respective different positions on a surface of the vehicle V on the Z direction side while scanning in one direction. The upper sensors 16A1 and 16A2 perform scanning with the laser beams LT in the horizontal direction. The directions of scanning of the laser beams LT by the upper sensors 16A1 and 16A2 preferably intersect each other. The directions of scanning of the laser beams LT by the upper sensors 16A1 and 16A2 are preferably set to pass through a side of the front surface of the driver seat of the vehicle V and a side of the side surface of the vehicle V.

The upper sensor 16A1 receives, from the surface of the vehicle V on the Z direction side, reflected light of the laser beam LT emitted by the upper sensor 16A1. The upper sensor 16A1 acquires points Q1a of reflected light from the surface of the vehicle V on the Z direction side. The points Q1a are arranged in the scanning direction of the upper sensor 16A1. Similarly, the upper sensor 16A2 receives, from the surface of the vehicle V on the Z direction side, reflected light of the laser beam LT emitted by the upper sensor 16A2, and acquires points Q2a of reflected light from the surface of the vehicle V on the Z direction side. The points Q2a are arranged in the scanning direction of the upper sensor 16A2. The target object information acquisition unit 54a acquires information of the points Q1a and Q2a (information of coordinates of the points Q1a and Q2a). In addition, the target object information acquisition unit 54a reads information of the dimensions of the vehicle V from, for example, the storage unit 42. The target object information acquisition unit 54 calculates the position and orientation of the pallet P based on information of the points Q1a and Q2a and information of the dimensions of the vehicle V. In the example illustrated in FIG. 7, a ratio of the length of the vehicle V in the front and back directions and the length thereof in the lateral direction can be calculated based on information of the dimensions of the vehicle V, and thus the position and orientation of the pallet P can be calculated based on the ratio of the length of the vehicle V in the front and back directions and the length thereof in the lateral direction and a ratio of the length of the entire arrayed points Q1a and the length of the entire arrayed points Q2a. In this manner, in the example of FIG. 14, the target object information acquisition unit 54a calculates the position and orientation of the vehicle V based on information of the points Q1a and Q2a and information of the dimensions of the vehicle V.

The method of detection of the position and orientation of the vehicle V by the upper sensor 16A is not limited to the above-described method but may be another detection method. When a plurality of upper sensors 16A are provided as in the example of FIG. 15, no side sensor 16B needs to be provided. Although the two upper sensors 16A are provided in the example of FIG. 15, three upper sensors 16A or more may be provided.

Figure 16:
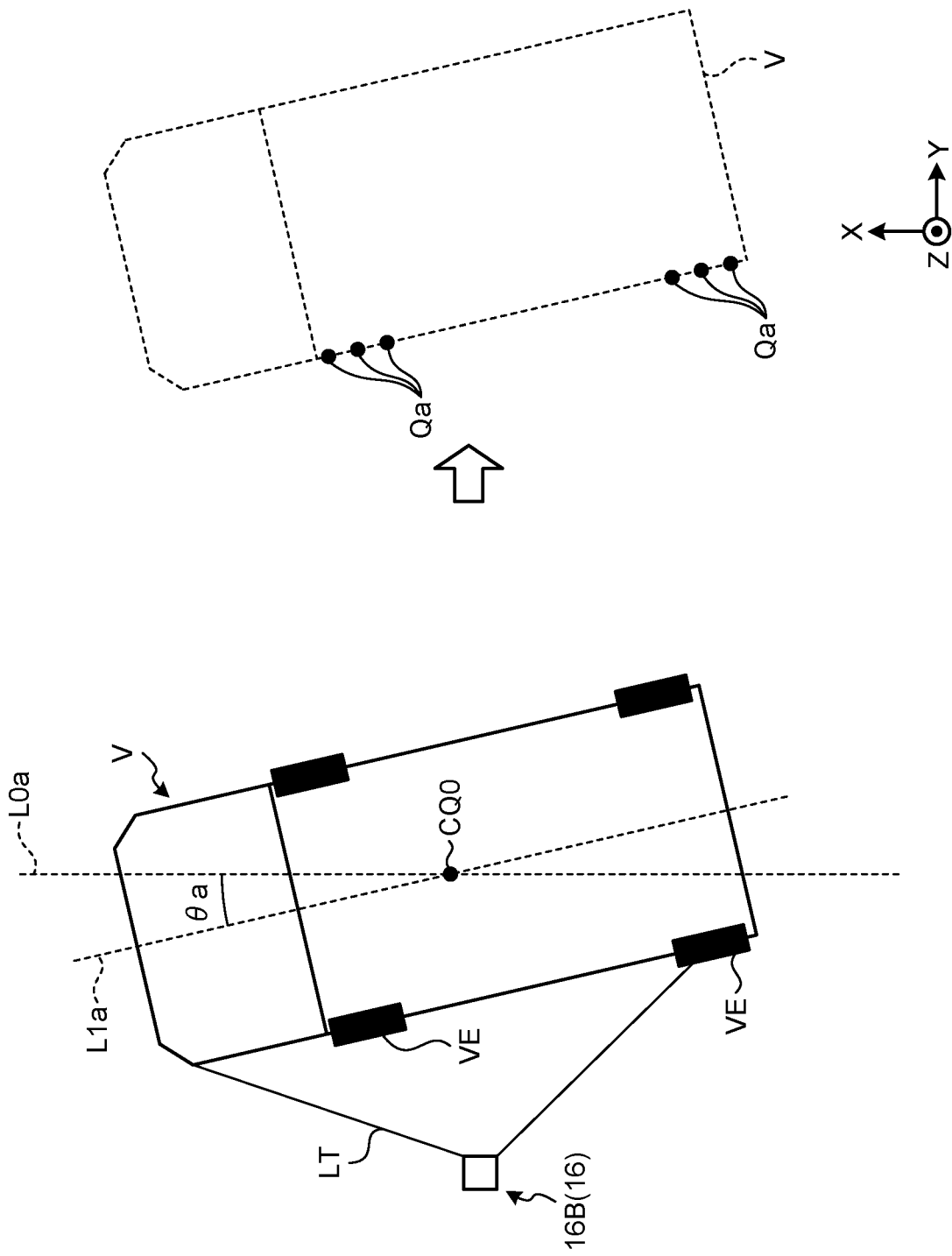
FIG. 16 is a diagram illustrating other exemplary detection of the position and orientation of the vehicle by the sensor.

FIG. 16 is a diagram illustrating other exemplary detection of the position and orientation of the vehicle by the sensor. In the example of FIG. 16, one side sensor 16B is provided as the sensor 16 in the installation region AR0. The side sensor 16B emits the laser beam LT toward the horizontal direction side while scanning. The laser beam LT from the side sensor 16B is emitted to the side surface of the vehicle V. More specifically, in the present example, the laser beam LT is emitted to a side surface of the tire VE of the vehicle V. In other words, the side sensor 16B emits the laser beam LT to the side surface of the tire VE of the vehicle V while scanning in one direction. The side sensor 16B performs scanning with the laser beam LT in the horizontal direction.

The side sensor 16B receives, from the side surface of the tire VE, reflected light of the laser beam LT emitted by the side sensor 16B. The side sensor 16B acquires points Qa of reflected light from the side surface of the tire VE. The target object information acquisition unit 54a acquires information of the points Qa (information of coordinates of the points Qa). In addition, the target object information acquisition unit 54a reads information of predetermined dimensions of the vehicle V from, for example, the storage unit 42. The target object information acquisition unit 54a calculates the position and orientation of the vehicle V based on information of the points Q and information of the dimensions of the vehicle V. In the example of FIG. 16, since the orientation of the tire VE matches with the orientation of the vehicle V, the points Qa are arranged in the front and back directions of the vehicle V. Thus, once the coordinates of the points Qa are determined, the orientation of the vehicle V can be calculated, and the position of the vehicle V can be calculated based on the coordinates of the points Qa (in other words, the position of the tire VE) and information of the dimensions of the vehicle V. In this manner, in the example of FIG. 16, the target object information acquisition unit 54a calculates the position and orientation of the vehicle V based on information of the points Qa and information of the dimensions of the vehicle V.

The method of detection of the position and orientation of the pallet P by the side sensor 16B is not limited to the above-described method but may be another method. For example, the side sensor 16B may emit the laser beam LT to another part of the side surface of the vehicle V instead of the tire VE. When the side sensor 16B is provided as in the example of FIG. 16, no upper sensor 16A needs to be provided. However, the side sensor 16B and the upper sensor 16A may be provided, and for example, the side sensor 16B may detect the orientation of the pallet P and the upper sensor 16A may detect the position of the pallet P. In the example of FIG. 16, one side sensor 16B is provided, but two side sensors 16B or more may be provided.

The target object information acquisition unit 54a illustrated in FIG. 13 calculates the position and orientation of the pallet P based on information of the position and orientation of the vehicle V detected by the sensor 16. For example, the target object information acquisition unit 54a reads, from the storage unit 42, the position information of the pallet P relative to the vehicle V, in other words, the position and orientation of the information of the pallet P relative to the vehicle V. The target object information acquisition unit 54a calculates the position and orientation of the pallet P based on the position and orientation of the pallet P relative to the vehicle V and the position and orientation of the vehicle V detected by the sensor 16. Specifically, for example, the relative position and relative orientation of the pallet P relative to the vehicle V are set as, for example, a normal position in advance, and the target object information acquisition unit 54a converts the position and orientation of the vehicle V acquired from the sensor 16 into the position and orientation of the pallet P based on the relative position and relative orientation of the pallet P relative to the vehicle V.

As illustrated in FIG. 14, a sensor 17 configured to detect the position and orientation of the pallet P in the vehicle V may be provided. The method of detection of the position and orientation of the pallet P by the sensor 17 may be any method, and for example, the sensor 17 may emit the laser beam LT to the pallet P or may capture the pallet P as a camera. In this case, the target object information acquisition unit 54a may calculate the position and orientation of the pallet P based on a result of detection by the sensor 16 and a result of detection by the sensor 17 or may calculate the position and orientation of the pallet P based on only a result of detection by the sensor 17. In addition, a movement mechanism configured to change the position of the sensor 17 in the Z direction may be provided. In this case, for example, a control device of the movement mechanism changes the position of the sensor 17 in the Z direction in accordance with the height of the cargo bed of the vehicle V so that the sensor 17 can emit the laser beam LT to the pallet P.

Route Setting Unit

By a method same as that in the first embodiment, the route setting unit 56a illustrated in FIG. 13 sets the target position-posture AR1 based on the position and orientation of the pallet P acquired by the target object information acquisition unit 54a, and generates the route R to the target position-posture AR1.

Cargo Bed Height Information Acquisition Unit

The cargo bed height information acquisition unit 57a illustrated in FIG. 13 acquires a detection result of information of a height DV of the cargo bed in the vehicle V. As illustrated in FIG. 14, the height DV is the height of the bottom surface of the housing room VA in which the pallet P is housed in the Z direction, and is the distance from the region A to the bottom surface of the housing room VA. The cargo bed height information acquisition unit 57a may acquire a detection result of information of the height DV from the sensor 16 or may acquire a detection result of information of the height DV a sensor other than the sensor 16. For example, the side sensor 16B can detect the position of the bottom surface of the housing room VA in the Z direction by scanning in the Z direction. Alternatively, for example, a camera provided on a side of the vehicle V may capture an image of the housing room VA, and the cargo bed height information acquisition unit 57a may calculate the height DV based on the image of the housing room VA. In this case, for example, the cargo bed height information acquisition unit 57a may specify the position of the flap part VC based on the image captured by the camera and may calculate, as the height DV, the height from the region A to an upper end part of the flap part VC. Alternatively, for example, a camera provided on the back side of the vehicle V may capture an image of the back side of the vehicle V, and the cargo bed height information acquisition unit 57a may calculate the height DV based on the back side image. In this case, for example, the cargo bed height information acquisition unit 57a may specify the position of the back door VD based on the image captured by the camera and may calculate, as the height DV, the height from the region A to a lower end part of the back door VB. However, the processing of calculating the height DV of the cargo bed by the cargo bed height information acquisition unit 57a is not essential. In this case, for example, the moving object 10 detects the height DV through the sensor 26.

Information Output Unit

The information output unit 60 transmits information of the route R generated by the route setting unit 56 and information of the height DV of the cargo bed to the moving object 10. In the second embodiment as well, the overhang determination unit 58 may be provided, and the information output unit 60 may transmit a result of detection by the overhang determination unit 58 to the moving object 10.

Movement Control Process

Figure 17:
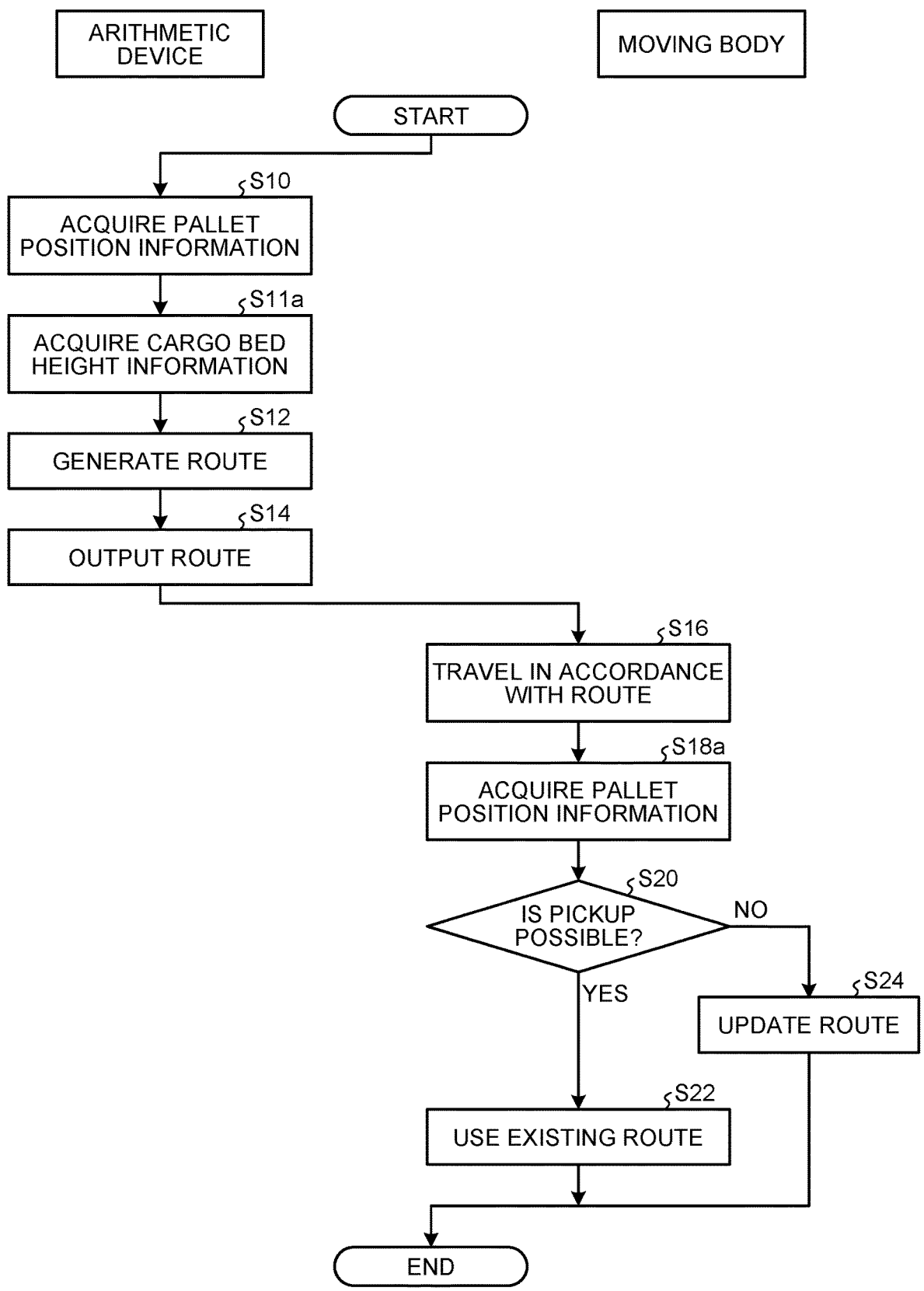
FIG. 17 is a flowchart for describing the process of moving-object movement control of according to the second embodiment.

FIG. 17 is a flowchart for describing the process of movement control of the moving object according to the second embodiment. As illustrated in FIG. 17, the arithmetic device 14a acquires, by the target object information acquisition unit 54a, the position information of the pallet P from the sensor 16 (step S10). The target object information acquisition unit 54a calculates the position and orientation of the pallet P mounted on the vehicle V based on, for example, the position and orientation of the vehicle V detected by the sensor 16. The arithmetic device 14a acquires, by the cargo bed height information acquisition unit 57a, information of the height DV of the cargo bed of the vehicle V (step S11a). The arithmetic device 14a generates, by the route setting unit 56a, the route R to the target position-posture AR1 based on the position and orientation of the pallet P, and outputs, by the information output unit 60, information of the route R and the height DV to the moving object 10 (step S14).

Having acquired the information of the route R from the arithmetic device 14, the moving object 10 travels in accordance with the route R under control of the movement control unit 82 (step S16). Then, when having traveled on the route R and reached a position at which the pallet P in the vehicle V can be detected by the sensor 26, the moving object 10 acquires, by the route update unit 84, the position information of the pallet P and the position of the opening Pb from the sensor 26 (step S18). The route update unit 84 determines, based on the position information of the pallet P and the position of the opening Pb, whether the moving object 10 can pick up the pallet P when having traveled the route R and arrived at the target position-posture AR1 (step S20). When it is determined that the moving object 10 can pick up the pallet P (Yes at step S20), the moving object 10 uses the existing route R without updating the route R and continues traveling in accordance with the existing route R (step S22). When it is determined that the moving object 10 cannot pick up the pallet P (No at step S20), the route update unit 84 updates the route R (step S24), and the moving object 10 travels on the updated route R. When having arrived at the target position-posture AR1, the moving object 10 moves the fork 24 to the height of the cargo bed in accordance with information of the height DV of the cargo bed, and then travels straight, picks up the pallet P, and conveys the pallet P to another place.

Effects of the Present Embodiment

The vehicle V does not stop at a position and an orientation determined in the installation region AR0 or has a different vehicle-dependent size in some cases. Thus, it is difficult to set a route in advance when the pallet P in the vehicle V is to be picked up. With the arithmetic device 14 according to the present embodiment, the position and posture of the vehicle V are detected by the sensor 16 provided in a place other than to the moving object 10, the position and orientation of the pallet P are estimated, and the route R to the target position-posture AR1 is generated. The route R generated in this manner is based on consideration of the position and posture of the vehicle V, and thus is a highly accurate route through which the pallet P can be appropriately picked up. In addition, since the sensor 16 provided in a place other than to the moving object 10 is used, the highly accurate route R can be generated before the moving object 10 starts movement. The moving object 10 approaches the pallet P in accordance with this route R, and thus, for example, when a trajectory is regenerated, it is possible to reduce a difference from the original route R and reduce a calculation load. In this manner, with the arithmetic device 14a according to the present embodiment, also in a case when the pallet P in the vehicle V is picked up, it is possible to generate the route R through which the pallet P can be appropriately picked up.

As described above, in the second embodiment, the pallet P is mounted on the vehicle V. In the second embodiment, the sensor 16 may include the upper sensors 16A. The upper sensors 16A emit the laser beams LT to respective different positions on the surface of the vehicle V on the upper side in the vertical direction while scanning in one direction, and receive reflected light of the laser beams LT from the surface of the vehicle V on the upper side in the vertical direction. The target object information acquisition unit 54a acquires, as the position information of the pallet P, the orientation of the vehicle V calculated based on the reflected light received by the upper sensors 16A. With the arithmetic device 14a according to the present embodiment, since the upper sensors 16A emit the laser beams LT to the surface of the vehicle V on the upper side in the vertical direction, it is possible to highly accurately acquire the position and orientation of the vehicle V, and thus it is possible to appropriately generate the route R.

The sensor 16 may include the side sensor 16B. The side sensor 16B emits the laser beam LT to the side surface of the vehicle V while scanning in one direction and receives reflected light of the laser beam LT from the side surface of the vehicle V. The target object information acquisition unit 54a acquires, as the position information of the pallet P, the orientation of the vehicle V calculated based on the reflected light received by the side sensor 16B. With the arithmetic device 14a according to the present embodiment, since the side sensor 16B emits the laser beam LT to the side surface of the vehicle V, it is possible to highly accurately acquire the position and orientation of the vehicle V, and thus it is possible to appropriately generate the route R.

The arithmetic device 14a may include the cargo bed height information acquisition unit 57a configured to acquire a detection result of information of the height DV of the cargo bed on which the pallet P is mounted in the vehicle V. The information output unit 60 outputs the information of the height DV of the cargo bed to the moving object 10. With the arithmetic device 14a according to the present embodiment, since the information of the height DV of the cargo bed is output to the moving object 10, the moving object 10 can operate the fork 24 based on the information of the height DV and appropriately pick up the pallet P in the vehicle V.

Another Exemplary Sensor

In the above description, the sensor 16 is fixed to the facility W. However, the sensor 16 does not necessarily need to be fixed to the facility W. The sensor 16 may be provided to a moving object other than the moving object 10 in the facility W. In this case, for example, the moving object other than the moving object 10 may be a vehicle provided with the sensor 16 and configured to patrol in the facility W, or a flying body (such as a drone) provided with the sensor 16 and configured to fly in the facility W. When the sensor 16 is provided on a moving object, the moving object preferably has a function to estimate the self-position. The moving object may estimate the self-position by any method and may use, for example, the detection bodies S like the moving object 10.

Example in which Pallet is Disposed on Vehicle

The movement control system 1a may set, as the route R based on a detection result of the position and orientation of the vehicle V, a path for moving toward a load position of the pallet P in the vehicle V. The load position is a position at which the pallet P is loaded in the vehicle V. In this case, for example, the arithmetic device 14a calculates position information of the load position (the position and orientation of the load position) based on a detection result of the position and orientation of the vehicle V by a method same as that of the above-described calculation of the position information of the pallet P, and sets, as the route R, a path to a target position at which predetermined position and orientation relative to the load position are reached. When having traveled on the route R while holding the pallet and having reached the load position, the moving object 10 unloads the pallet P at the load position. In this manner, the movement control system 1a not only can generate the route R to the pallet P when the pallet P is to be picked up, but also can generate, by using the same method, the route R to the load position at which the pallet P is to be unloaded. In this case, the load position corresponds to a target object.

The embodiments of the present invention are described above but not limited to the described contents of the embodiments. The above-described components include those easily thought of by the skilled person in the art, those identical in effect, and equivalents. The above-described components may be combined as appropriate. The components may be omitted, replaced, and changed in various kinds of manners without departing from the scope of the above-described embodiments.

REFERENCE SIGNS LIST

1 Movement control system
10 Moving object
12 Management system
14 Arithmetic device
16 Sensor
28 Control device
54 Target object information acquisition unit
56 Route setting unit
58 Overhang determination unit
60 Information output unit
80 Route information acquisition unit
82 Movement control unit
84 Route update unit
P Pallet (target object)
R Route (path)

The invention claimed is:

1. An arithmetic device configured to output information to a moving object that automatically moves, the arithmetic device comprising:
    a computer to execute a program; and
    a memory to store the program which, when executed by the computer, the computer performs processes of:
    acquiring, from a sensor provided in a place other than to the moving object, vehicle position information that is information related to position and orientation of a vehicle on which a target object is mounted, and calculating, based on the acquired vehicle position information and preset relative position and relative orientation of the target object relative to the vehicle, position information of a target object, the position information being information related to position and orientation of the target object;
    setting, based on the position information of the target object, a path to a target position at which predetermined position and orientation relative to the target object are reached to enable the moving object to pick up the target object; and
    outputting information on the path to the moving object to control movement of the moving object to the target position according to the path, wherein
    the sensor includes:
        a plurality of upper sensors provided vertically above the target object and configured to detect at least information related to the orientation of the target object; and
        a side sensor provided lateral to the target object and configured to detect at least information related to the position of the target object,
    the upper sensors are configured to emit laser beams to scan respective different positions on a surface of the vehicle on an upper side in a vertical direction with the laser beams in one direction and receive reflected light of the laser beams from the surface of the vehicle on the upper side in the vertical direction,
    the side sensor is configured to emit a laser beam to scan a side surface of the vehicle with the laser beam in one direction and receive reflected light of the laser beam from the side surface of the vehicle.

2. The arithmetic device according to claim 1, wherein the sensor is configured to detect the position information of the target object by emitting a laser beam toward the target object and receiving reflected light of the laser beam.

3. The arithmetic device according to claim 1, wherein the target object is mounted on a vehicle,
    the computer further performs processes of:
        acquiring a detection result of information on a height of a cargo bed on which the target object is mounted in the vehicle, and
        outputting the information on the height of the cargo bed to the moving object.

4. The arithmetic device according to claim 1, wherein the target object is a pallet on which a package is mounted, and
    the computer performs a process of determining whether the package overhangs from the pallet based on a result of detection from the sensor.

5. A movement control system comprising:
the arithmetic device according to claim 1; and
the moving object.

6. A control device for a moving object that automatically moves, the control device comprising:
a computer to execute a program; and
a memory to store the program which, when executed by the computer, the computer performs processes of:
acquiring a path to a target position at which predetermined position and orientation relative to a target object are reached to enable the moving object to pick up the target object, the path being generated based on position information of the target object, the position information being information related to position and orientation of the target object that are detected by a sensor provided in a place other than to the moving object; and
moving the moving object based on the path, wherein
the position information is calculated based on acquired vehicle position information and preset relative position and relative orientation of the target object relative to a vehicle,
the vehicle position information is information related to position and orientation of the vehicle on which the target object is mounted,
the sensor includes:
a plurality of upper sensors provided vertically above the target object and configured to detect at least information related to the orientation of the target object; and
a side sensor provided lateral to the target object and configured to detect at least information related to the position of the target object,
the upper sensors are configured to emit laser beams to scan respective different positions on a surface of the vehicle on an upper side in a vertical direction with the laser beams in one direction and receive reflected light of the laser beams from the surface of the vehicle on the upper side in the vertical direction,
the side sensor is configured to emit a laser beam to scan a side surface of the vehicle with the laser beam in one direction and receive reflected light of the laser beam from the side surface of the vehicle.

7. A moving object comprising the control device according to claim 6.

8. A calculation method of outputting information to a moving object that automatically moves, the calculation method comprising:
acquiring, from a sensor provided in a place other than to the moving object, vehicle position information that is information related to position and orientation of a vehicle on which a target object is mounted, and calculating, based on the acquired vehicle position information and preset relative position and relative orientation of the target object relative to the vehicle, position information of a target object, the position information being information related to position and orientation of the target object;
generating, based on the position information of the target object, a path to a target position at which predetermined position and orientation relative to the target object are reached to enable the moving object to pick up the target object; and
outputting information of the path to the moving object to control movement of the moving object to the target position according to the path, wherein
the sensor includes:
a plurality of upper sensors provided vertically above the target object and configured to detect at least information related to the orientation of the target object; and
a side sensor provided lateral to the target object and configured to detect at least information related to the position of the target object,
the upper sensors are configured to emit laser beams to scan respective different positions on a surface of the vehicle on an upper side in a vertical direction with the laser beams in one direction and receive reflected light of the laser beams from the surface of the vehicle on the upper side in the vertical direction,
the side sensor is configured to emit a laser beam to scan a side surface of the vehicle with the laser beam in one direction and receive reflected light of the laser beam from the side surface of the vehicle.

9. A non-transitory computer-readable storage medium storing a program for causing a computer to execute a calculation method of outputting information to a moving object that automatically moves, the program comprising:
acquiring, from a sensor provided in a place other than to the moving object, vehicle position information that is information related to position and orientation of a vehicle on which a target object is mounted, and calculating, based on the acquired vehicle position information and preset relative position and relative orientation of the target object relative to the vehicle, position information of a target object, the position information being information related to position and orientation of the target object;
generating, based on the position information of the target object, a path to a target position at which predetermined position and orientation relative to the target object are reached to enable the moving object to pick up the target object; and
outputting information of the path to the moving object to control movement of the moving object to the target position according to the path, wherein
the sensor includes:
a plurality of upper sensors provided vertically above the target object and configured to detect at least information related to the orientation of the target object; and
a side sensor provided lateral to the target object and configured to detect at least information related to the position of the target object,
the upper sensors are configured to emit laser beams to scan respective different positions on a surface of the vehicle on an upper side in a vertical direction with the laser beams in one direction and receive reflected light of the laser beams from the surface of the vehicle on the upper side in the vertical direction,
the side sensor is configured to emit a laser beam to scan a side surface of the vehicle with the laser beam in one direction and receive reflected light of the laser beam from the side surface of the vehicle.

* * * * *